United States Patent
Holroyd et al.

(10) Patent No.: US 10,071,836 B2
(45) Date of Patent: Sep. 11, 2018

(54) DOSING DISPENSING CLOSURE

(71) Applicant: Reckitt Benckiser (Brands) Limited, Slough, Berkshire (GB)

(72) Inventors: Simon Holroyd, Cambridge (GB); Aki Hannu Einari Laakso, Cambridge (GB); Xorge Castro Pelayo, Cambridge (GB); Benjamin John Strutt, Cambridge (GB)

(73) Assignee: Reckitt Benckiser (Brands) Limited, Slough, Berkshire (GB)

( * ) Notice: Subject to any disclaimer, the term of this patent is extended or adjusted under 35 U.S.C. 154(b) by 0 days.

(21) Appl. No.: 15/302,620

(22) PCT Filed: Apr. 15, 2015

(86) PCT No.: PCT/GB2015/051143
§ 371 (c)(1),
(2) Date: Oct. 7, 2016

(87) PCT Pub. No.: WO2015/159078
PCT Pub. Date: Oct. 22, 2015

(65) Prior Publication Data
US 2017/0029177 A1   Feb. 2, 2017

(30) Foreign Application Priority Data

Apr. 16, 2014 (GB) .................................. 1406899.4
May 14, 2014 (GB) .................................. 1408546.8

(51) Int. Cl.
*B65D 47/20* (2006.01)
*B65D 41/04* (2006.01)
(Continued)

(52) U.S. Cl.
CPC ......... *B65D 47/2018* (2013.01); *B65D 41/04* (2013.01); *G01F 11/04* (2013.01); *G01F 11/262* (2013.01); *G01F 11/286* (2013.01)

(58) Field of Classification Search
CPC ..... B65D 41/04; B65D 47/2018; G01F 11/04; G01F 11/262; G01F 11/286
See application file for complete search history.

(56) References Cited

U.S. PATENT DOCUMENTS 4,811,871 A * 3/1989 Wass .................. B67C 9/00
                                                            222/212
6,241,129 B1   6/2001 Bonningue et al.
(Continued)

FOREIGN PATENT DOCUMENTS

EP   2444782 A1   11/1987
EP   1164362 A1   12/2001
(Continued)

OTHER PUBLICATIONS

GB Search Report for corresponding application GB 1408546.8 dated Sep. 18, 2014.
(Continued)

*Primary Examiner* — Paul R Durand
*Assistant Examiner* — Bob Zadeh
(74) *Attorney, Agent, or Firm* — Norris McLaughlin & Marcus PA

(57) ABSTRACT

The dose dispense closure for a squeezable container. The closure has a body cap 20 with inlet orifices 37 and a transit orifice 34 which allows composition into the body cap. A piston 80 is provided within the body cap 20. When the container is squeezed, the piston 80 is forced down, thereby expelling liquid from a control cap 40 until the piston 80 lands on the end of a duct 60 in the control cap 40 to prevent further dispensing. When the squeezing force is removed, (Continued)

the piston 80 returns to its start position. The piston 80 is biased towards the end wall 33 of the body cap 20 by a compression element 87. The body cap 20 is attached directly to the container such that rotation of the body cap allows adjustment of the dosage without having to remove the body cap.

19 Claims, 20 Drawing Sheets

(51) Int. Cl.
   *G01F 11/04* (2006.01)
   *G01F 11/28* (2006.01)
   *G01F 11/26* (2006.01)

(56) References Cited

U.S. PATENT DOCUMENTS

| | | | |
|---|---|---|---|
| 6,343,716 B1 | 2/2002 | Baudin et al. | |
| 6,415,961 B2 | 7/2002 | Bonningue | |
| 8,528,795 B2* | 9/2013 | Law | G01F 11/04 |
| | | | 222/477 |
| 8,997,788 B2* | 4/2015 | Wozna | B05B 11/047 |
| | | | 137/843 |
| 9,433,960 B2* | 9/2016 | Law | G01F 11/263 |
| 2011/0277857 A1* | 11/2011 | Wozna | B05B 11/047 |
| | | | 137/557 |
| 2012/0097714 A1* | 4/2012 | Hoefte | G01F 11/04 |
| | | | 222/477 |
| 2013/0214008 A1 | 8/2013 | van de Poll | |
| 2017/0029177 A1* | 2/2017 | Holroyd | B65D 47/2018 |

FOREIGN PATENT DOCUMENTS

| | | |
|---|---|---|
| EP | 2653842 A1 | 10/2013 |
| FR | 2974351 A1 | 10/2012 |
| WO | 2012016911 A1 | 2/2012 |
| WO | 2012062576 A1 | 5/2012 |
| WO | 2012171708 A1 | 12/2012 |

OTHER PUBLICATIONS

GB Search Report for corresponding application GB 1406889.4 dated Jun. 25, 2014.
International Search Report and Written Opinion of the International Searching Authority for corresponding application PCT/GB2015/051143 dated Jun. 26, 2015.

* cited by examiner

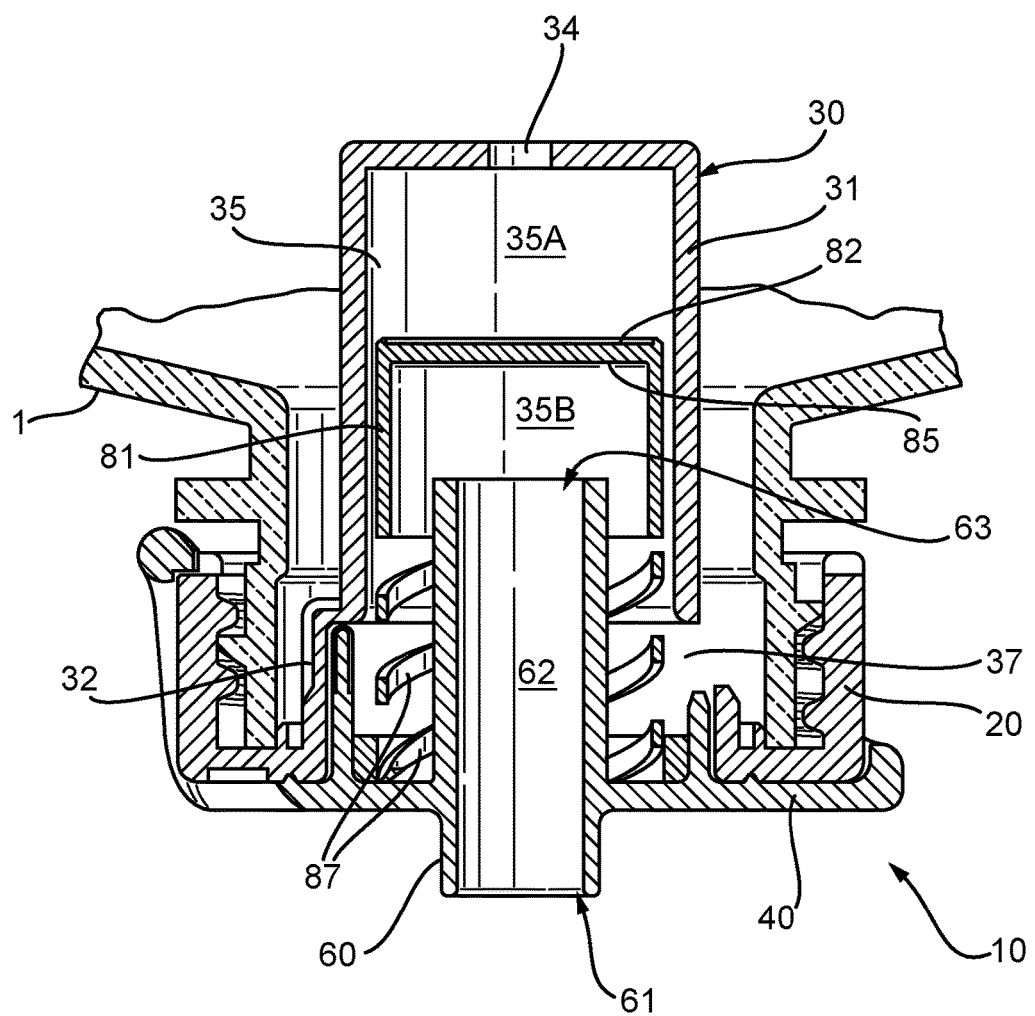

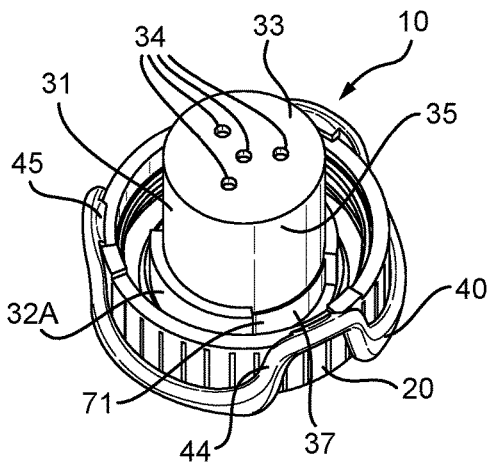
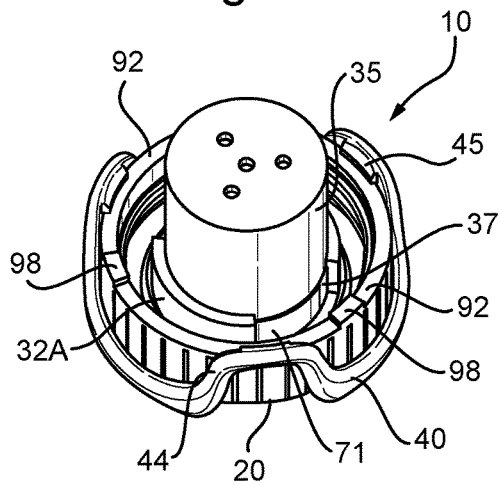
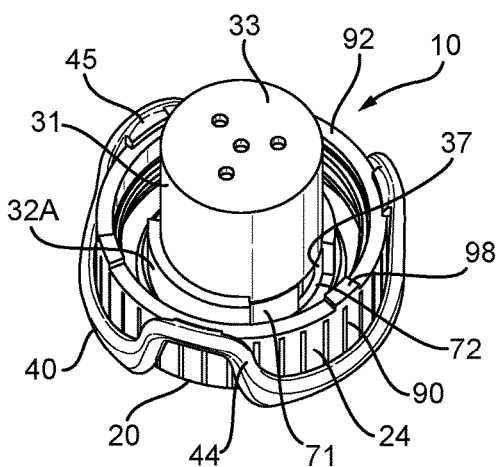
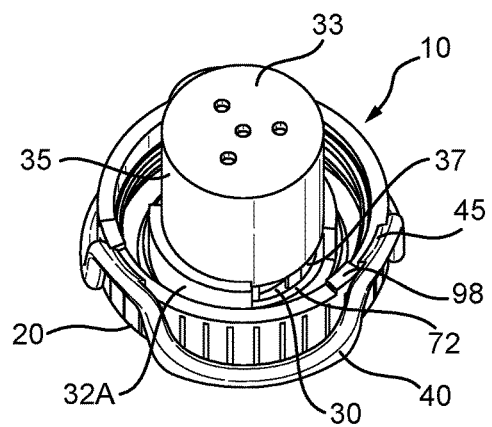

Fig. 12A1
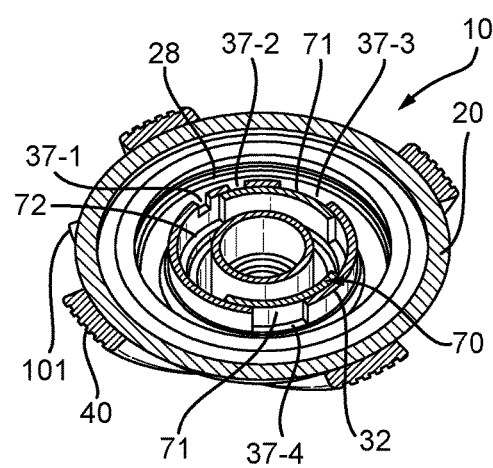
Fig. 12A2
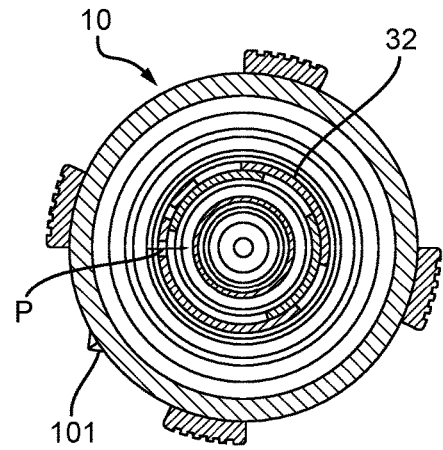
Fig. 12B1
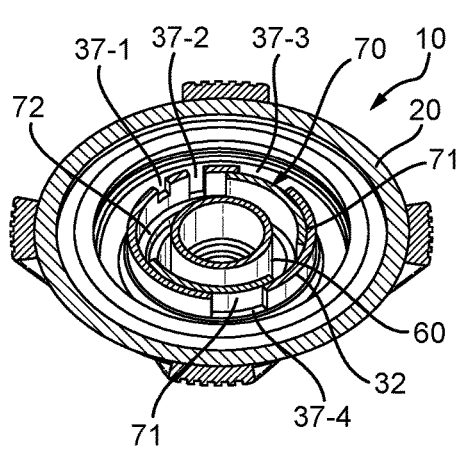
Fig. 12B2
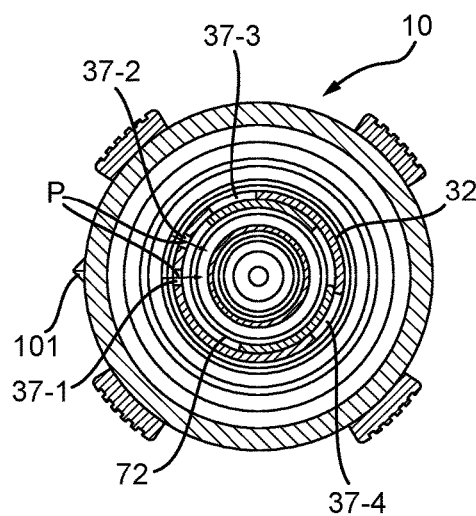

Fig. 12C1
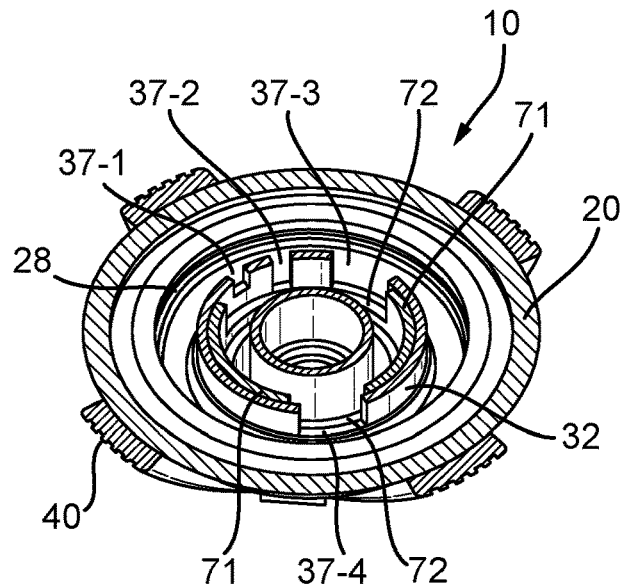
Fig. 12C2
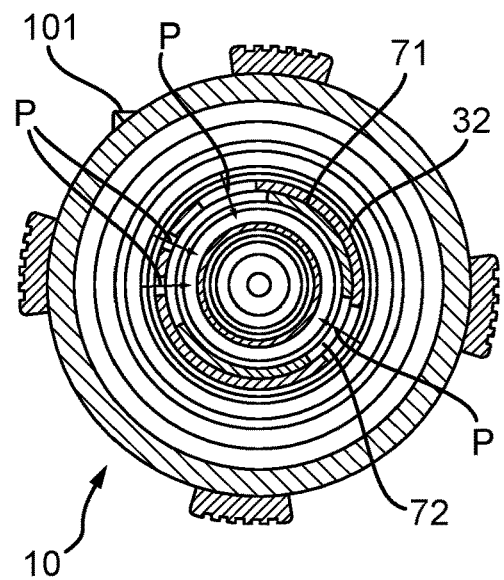

DOSING DISPENSING CLOSURE

This patent application claims the full priority benefit of PCT/EP 2015/051143 filed 15 Apr. 2015, and to the earlier filed priority applications, GB 1406889.4 filed 16 Apr. 2014, and GB 1408546.8 filed 14 May 2014. The entirety of the foregoing documents are herein incorporated by reference.

The present invention relates to an improved closure for a container, particularly a closure which provides a dosing dispensing feature of a quantity of a composition contained in the container.

In the field of consumer products, it is sometimes advantageous to dispense a unit dose, or an aliquot, of a composition from a container. Such for example may be desired wherein a unit dose is directed to be diluted, dispersed, or combined with a further material. Such may also be desired, for example, wherein a limited amount of the composition is to be dispensed for a particular use, such as a topical application.

The prior art has suggested a number of dosing dispensing closures which may be used in conjunction with a container, such as a compressible flask or bottle. Many of these are directed towards use with consumer, or pharmaceutical products. Such vary in complexity, and frequently require a number of discrete parts which need to be formed with relatively tight tolerances, and subsequently require assembly in a very specific configuration in order for the element parts to cooperatively provide the desired dosing function, with a degree of repeatability and reliability. Although such dosing dispensing closures may be effective, they frequently are also particularly complicated, and costly. Other prior art dosing dispensing closures provide limited function of generally effectively providing a predetermined dose from said closure, but offered no means whereby a user of the container having the dosing dispensing closure has any control over the dosage amount, or any other feature. Thus, such prior art dosing dispensing closures are circumscribed as to their utility.

Further more specific examples of prior art doesn't dispensing closures are disclosed in the following.

FR 2974351 discloses a closure which is may be attached to the neck of a compressible bottle or flask. The closure includes an exit orifice at an end thereof, and a cylindrical portion which is within the interior of the bottle. A movable piston, and a collapsible elements are also present within the cylindrical portion. A aperture in a side wall of the cylindrical portion allows for the admission of a quantity of a composition from the bottle to enter the cylinder in a space between the bottom of the cylinder and the exit orifice. Compression of the bottle urges the piston towards the exit orifice, which also seals the aperture, thus defining a dose which is urged outwardly from the exit orifice. This closure however offers no means whereby any part of the closure can be varied, or any manner in which the dispensing characteristics of the closure can be adjusted or varied.

US 2011/0277857 discloses a differential pressure metering device which can be provided to are inserted into the neck of a flexible container containing a fluid material. The differential pressure metering device includes a valve which is normally biased towards a rest position when the flexible container is unpressurized. FIG. 1 of the reference illustrates an embodiment wherein that the valve takes the shape of a movable sphere (ball) while in FIG. 3A the valve is in the form of a generally cylindrical element having a generally conical top, and a spring which urges the valve against an inlet of the said device. In use, when the flexible container is compressed, such as by grasping pressure exerted by human hand, the fluid material urges the valve away from its static position, thereby allowing a quantity of the fluid material to enter the device, and subsequently passed through the outlet of the device. While this closure appears to be effective in their certain conditions, it however provides no means whereby any part of the closure can be varied or its operation adjusted, nor provide any manner in which the dispensing characteristics of the closure can be varied by a consumer or end user of the product contained within set flexible container.

EP 0274256 describes a liquid dosing device which includes a closure which can be affixed within or upon the neck of a flexible container within which is a fluid material. Certain depicted embodiments include a movable piston which may transit within the cylinder forming part of the closure. In certain embodiments the piston includes a stem which extends sufficiently outwardly from an outlet of the closure such that, after dispensing operation, a user is required to push the stem inwardly, so two release and restore the piston to its original position within the closure. In other embodiments, the piston omits a stem, but it is noted that such a closure is only useful in conjunction with fluid materials having a relatively low viscosity.

WO 2012/171708 discloses a dispensing closure which is particularly useful for dispensing viscous liquids. The closure includes a cylinder and a movable piston, said piston being hollow and being necessarily buoyant with respect to the liquid being dispensed. The closure further requires a flexible valve, such as a silicone valve at the outlet of the closure, which automatically seals the outlet when pressure within the closure diminishes.

WO 2012/016911 and WO 2012/062576 are similar in many respects, and disclose a nozzle type closure having a very small outlet orifice, said nozzle including within its interior a movable piston having at a top edge thereof a flexible peripheral valve (membrane) across which must be caused to flow a fluid material contained within a flexible container. The output end of the closure is essentially conical, and tapers to a small outlet orifice having a cross-sectional area or diameter much smaller than an inlet orifice. An elastic band is also provided and is affixed to a part of the piston, and is used to retract the piston towards the inlet orifice between dispensing operations. While the closure of WO 2012/016911 does not provide any means where user of the closure can vary its dispensing characteristics, the closure of WO 2012/062576 includes a movable over, which provides a limited degree of user adjustability asked to the delivery characteristics. In either case, as the small outlet orifice of the nozzle appears to be quite small, it does not appear that the closures disclosing either of these documents would be particularly useful with any liquid having any appreciable degree of viscosity, and its use appears to be practically limited to low viscosity, e.g. "water thin" liquids.

U.S. Pat. No. 6,343,716 disclosures a metering and dispensing closure useful with a flexible bottle or flask. The closure includes a cylindrical portion having one or more openings in the sidewall thereof, and the two-part piston assembly, comprising a piston part and a movable stem part. In use, compression of a liquid within the container urges the piston and stem outwardly, from a first static position wherein the one or more openings in the cylinder sidewall are open to the interior of the bottle or flask, but the stem forms a liquid tight seal with a seat forming part of the exit orifice, to a second, dispensing position wherein the piston part is moved to obscure and seal the one or more openings in the sidewall, and concurrently a gap now formed between the stem and the seat allows for the egress of the liquid contained within the cylinder to exit via the exit orifice. When pressure is released, a spring urges the piston part and the stem to retract to the first static position. Although useful, the metering and dispensing closure disclosed in this document requires a number of component parts having relatively strict tolerances which also much be properly assembled in order for repeatable and reliable operation to occur. Furthermore, the provision of the stem and the corresponding seat provides only a relatively narrow circumferential gap for liquid to exit the container, when the stem is disengaged from the seat. Thus it appears that the use of this closure is limited to water—that liquids. Additionally, there is no provision for any user settable user adjustable features in this closure.

U.S. Pat. No. 6,241,129 discloses a closure useful for dispensing a liquid from a flexible container such as a flexible flask or bottle. The closure includes a cap, and a cylinder within which is a movable piston having one end terminating into a plug which extends through an exit orifice of the cap. In use, compression of the flexible flask or bottle urges the cylinder outwardly from the closure, causing a part of the piston to extend therefrom, and during which time liquid contained within the cylinder exits past the sidewalls of the now extended piston and plug. Upon release, a spring urges the piston and plug to their original positions, and plug forms a liquid type closure with the cap of the closure. While apparently effective, in operation netted the extended plug is often undesirable from a consumer perspective. Additionally, it appears from the disclosure that the tolerance of each part needs to be particularly controlled and maintained, and in addition when in the piston is extended to disengage the plug from the cap and thereby allowing for liquid to flow, the relatively small intermediate gap between the piston and the exit orifice of the cap shortly suggests that the utility of this closure is limited to water-thin liquids. Additionally, there appears to be no provision for any user settable or user adjustable features with this closure.

EP 2 444 782 and EP 2 653 842 both disclose a dose dispending closure which has a body cap with inlet orifices and a transit orifice which allows composition into the body cap. A piston is provided within the body cap. When the container is squeezed, the piston is forced down thereby expelling the liquid from a control cap until the piston lands on the end of a duct in the control cap to prevent further dispensing. When the squeezing force is removed, the piston is sucked back up to its start position. The references also disclose a control cap which is rotatable with respect to the body cap such that the effective size of the inlet can be adjusted thereby adjusting the dosage.

In these documents, a cage is provided on top of the body of the body cap in which a valve element is positioned in order to close the outlet into the body cap when the container is squeezed. This limits the flow onto the upstream side of the piston to prevent the piston from closing too quickly, thereby allowing liquid to be dispensed via the inlet orifice. When the squeezing force is released, the valve opens under the pressure force and the piston returns to its starting position. Thus, the dispenser is reliant upon the pressure and therefore has a low and unpredictable restoring force, for example, if the squeezing force is only slowly removed. While the closure has the ability to allow the user to adjust the size of the inlet orifices and hence the quantity of liquid, this is done by rotating the cap relative to the body cap. This can only be done by rotating the control cap relative to the body cap which requires unscrewing the control cap from the container and then rotating the body cap and the control cap with respect to one another. This will be a messy operation as the user is exposed to the contents of the container.

Thus, while the prior art is suggested various embodiments of dispensing closures or unit dose enclosures, these are not without shortcomings. Accordingly, there remains a real and present need in the art for further improvements in dosing dispensing closures. Is to these and other aspects of current invention is directed.

According to a first aspect of the present invention, there is provided a dosing dispenser closure as defined in claim 1.

The presence of a compression element biasing the piston towards the end wall of the body cap provides a relatively high and highly predictable restoring force which does not rely on the manner in which the user operates the device.

According to a second aspect of the present invention, there is provided a dosing dispensing closure according to claim 2. Because the cap top is attachable directly to a container containing the fluid composition, the adjustment of the quantity of liquid dispensed can be done without removing the control cap. This allows the user to adjust the amount dispensed without being exposed to the contents of the dispenser.

In a further aspect the present invention provides a dispensing container, which comprises the improved dosing dispensing closure which is affixed to a bottle, flask, or other container, which container comprises a quantity of a fluid composition.

In another aspect there is provided a method for controllably dispensing doses of a fluid composition from within a container, which method comprises the steps of: utilizing a container which contains a quantity of a fluid composition within its interior and which further includes a dispensing closure as described herein, and, dispensing dosed amounts of a fluid composition via the dosing dispensing closure from the container.

In a further aspect there is provided a method for controllably dispensing doses of a fluid composition of varying dose amounts from within a container, which method comprises the steps of: utilizing a container which contains a quantity of a fluid composition within its interior and which further includes a dispensing closure as described herein, and, dispensing dosed amounts of a fluid composition via the dosing dispensing closure from the container.

In a still further aspect the present invention provides a method for the manufacture or fabrication of a dosing dispensing closure, useful in conjunction with a container which comprises a quantity of fluid composition.

In a yet further aspect, the present invention provides a vendible product which comprises a dosing dispensing closure, and a container which includes a fluid composition.

These further aspects of the present invention will become more apparent, following a reading of the specification and appended drawings.

FIG. 1A provides a perspective view of a preferred embodiment of a dosing dispensing closure, affixed to the neck of a container. FIG. 1B provides an exploded view of the elements of the dosing dispensing closure according to FIG. 1A, as well as a portion of the container.

FIGS. 2A, 2B and 2C depict schematic, cross-sectional views of the dosing dispensing closure of FIGS. 1A and 1B, in three different configurations.

Figure 5:
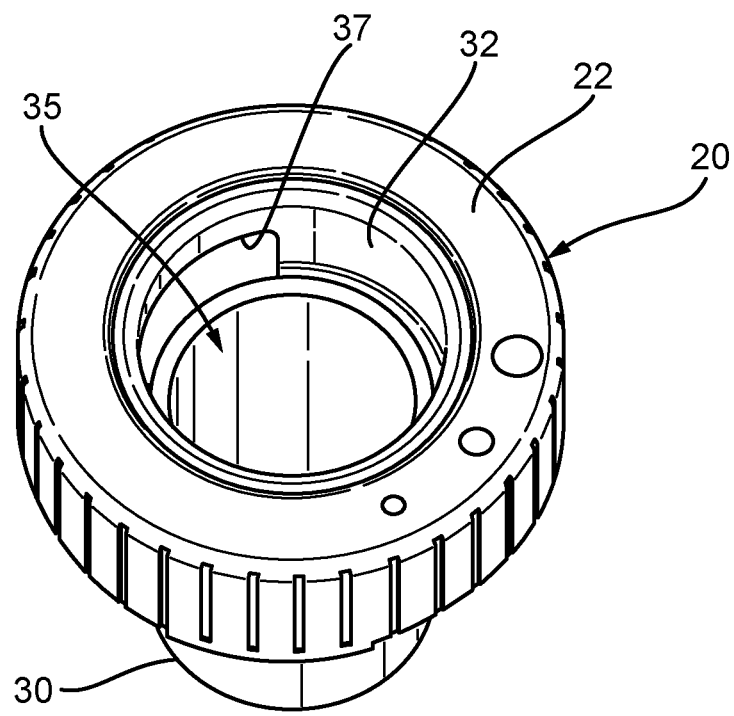

FIG. 5 provides a perspective view of a body cap of the dosing dispensing closure of the prior figures.

FIGS. 6A, 6B, 6C and 6D illustrate in perspective views a further embodiment of a dosing dispensing closure.

Figure 7A:
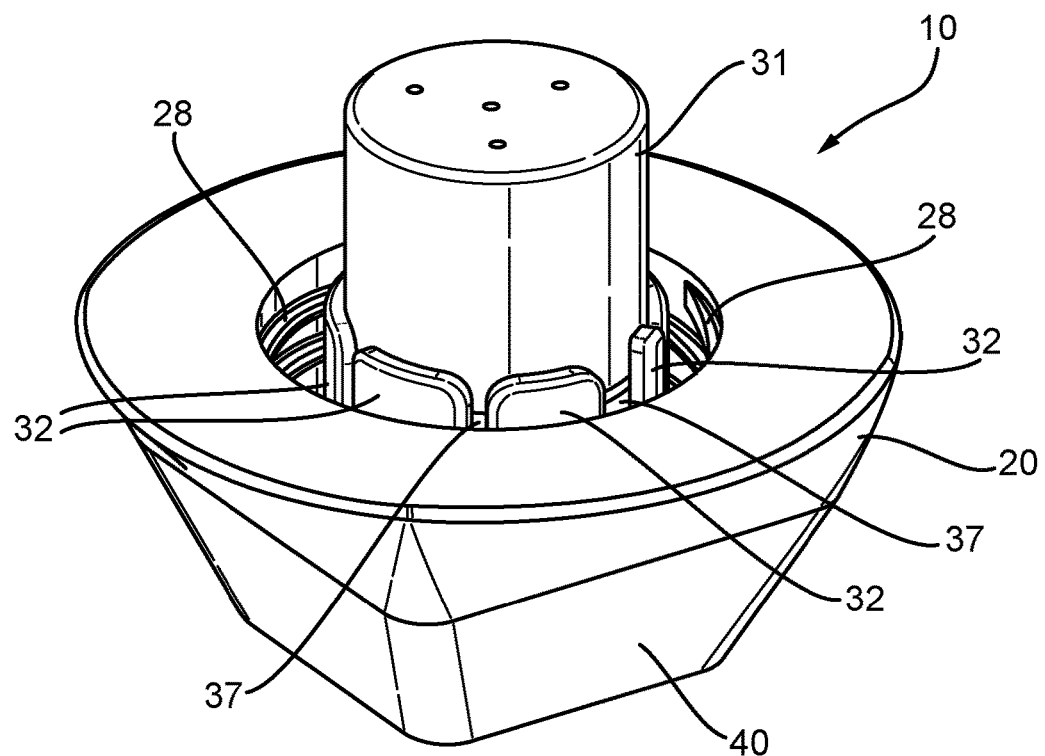

FIG. 7A illustrates in a perspective view a yet further embodiment of a dosing dispensing closure.

Figure 7B:
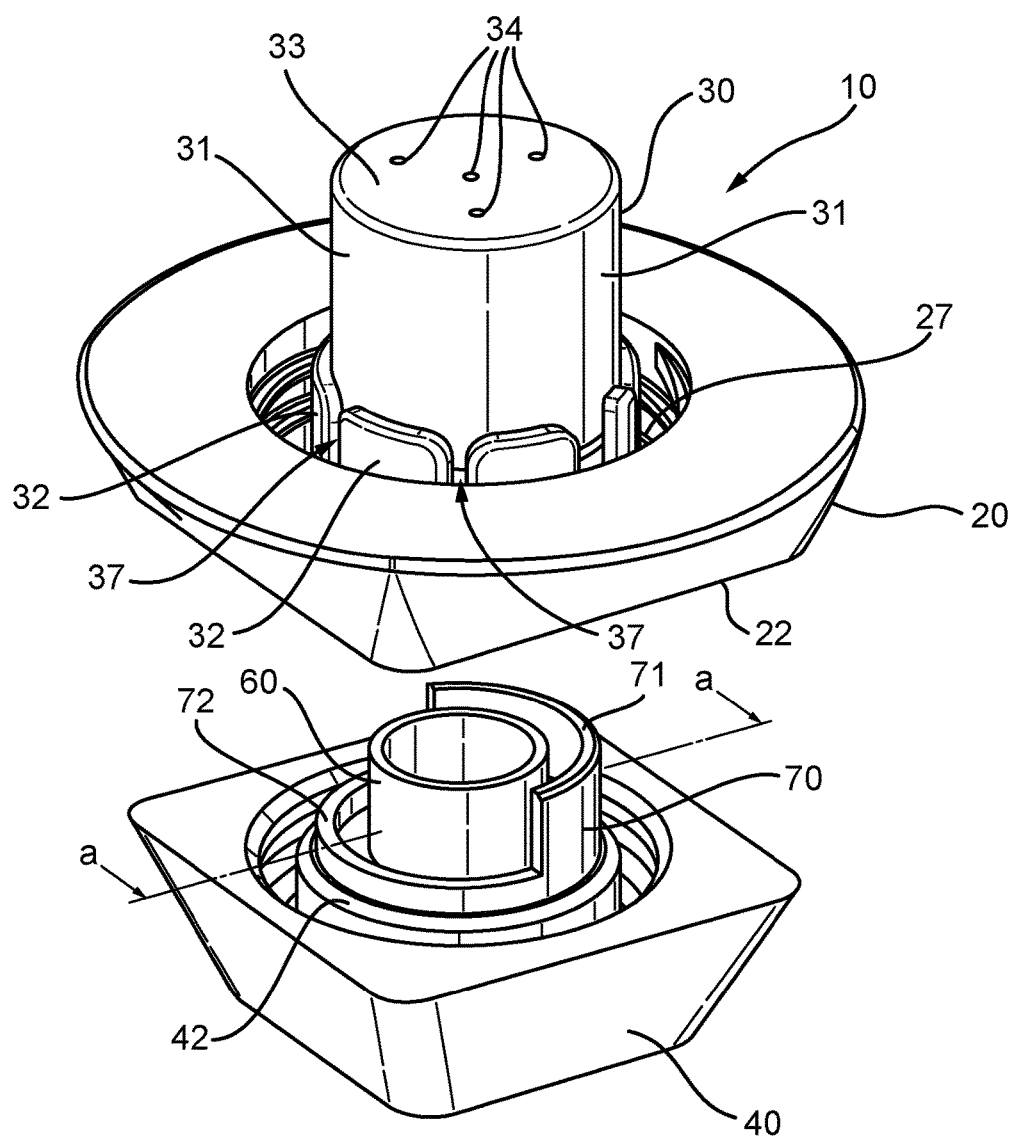

FIG. 7B provides an exploded, perspective view of the dosing dispensing closure of FIG. 7A.

Figure 7C:
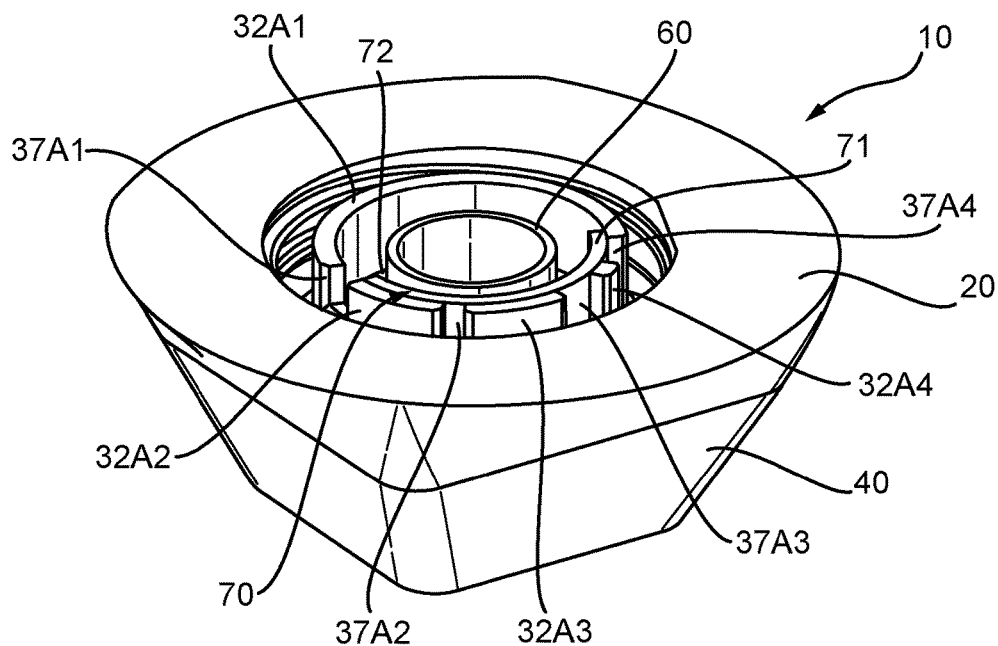
Figure 7D:
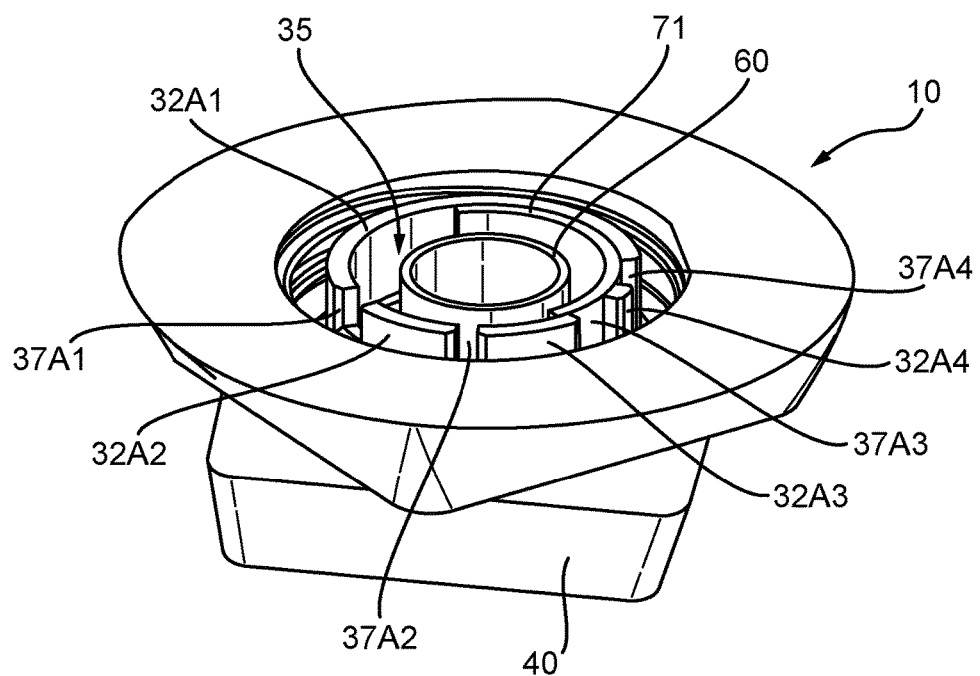
Figure 7E:
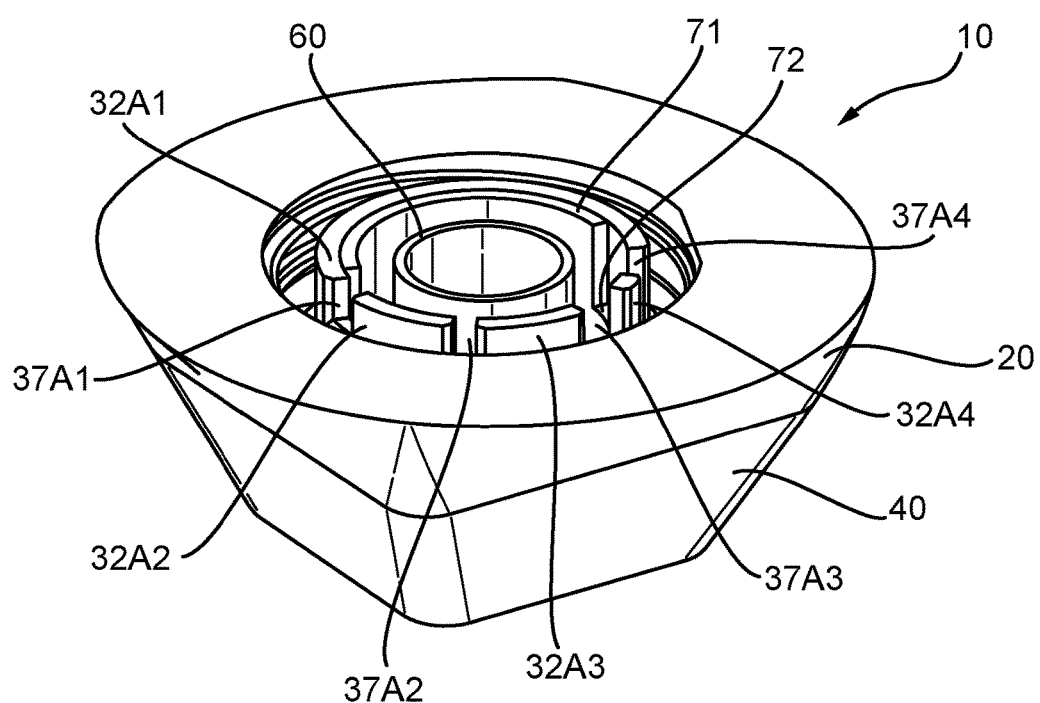

FIGS. 7C, 7D and 7E provides perspective partial cross-sectional views of the dosing dispensing closure of FIG. 7A in alternate configurations.

Figure 8A:
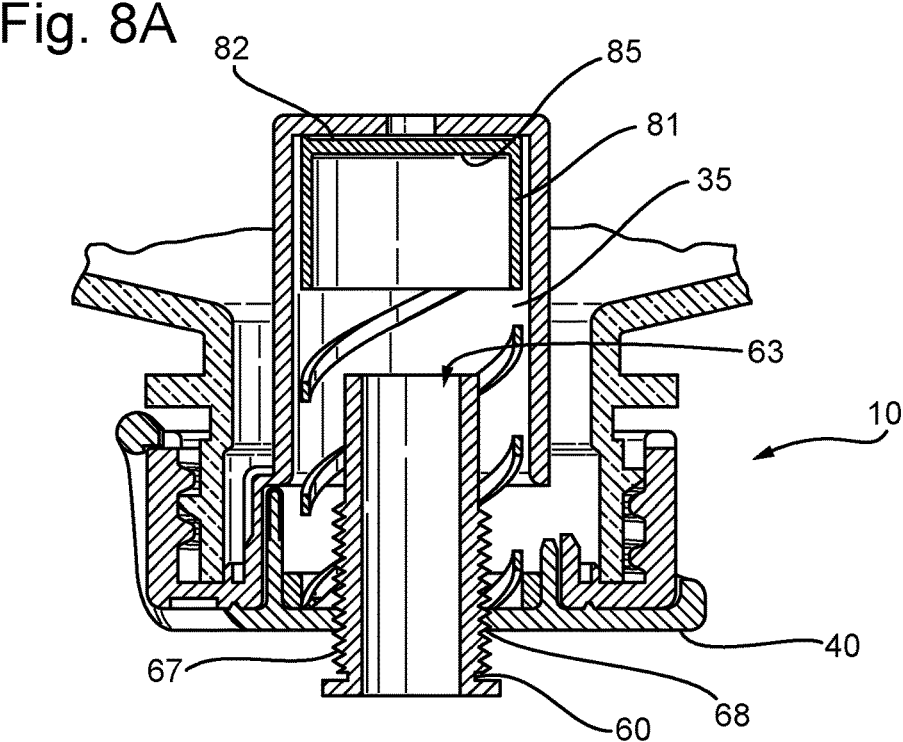
Figure 8B:
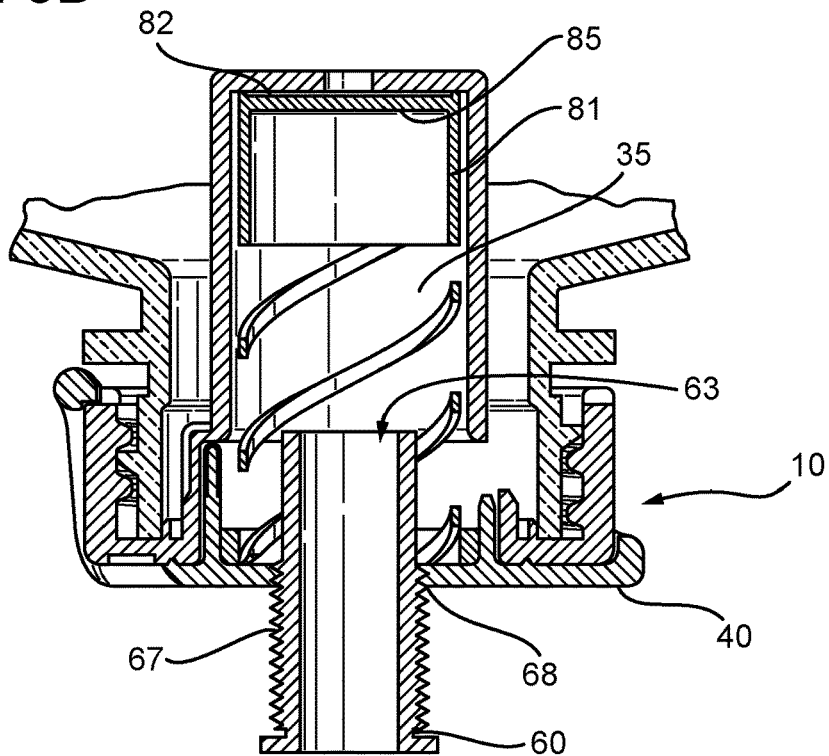

FIGS. 8A and 8B illustrate cross-sectional views of a further alternative embodiment of a dosing dispensing closure, which additionally includes a threaded and moveable fluid delivery tube.

Figure 9A:
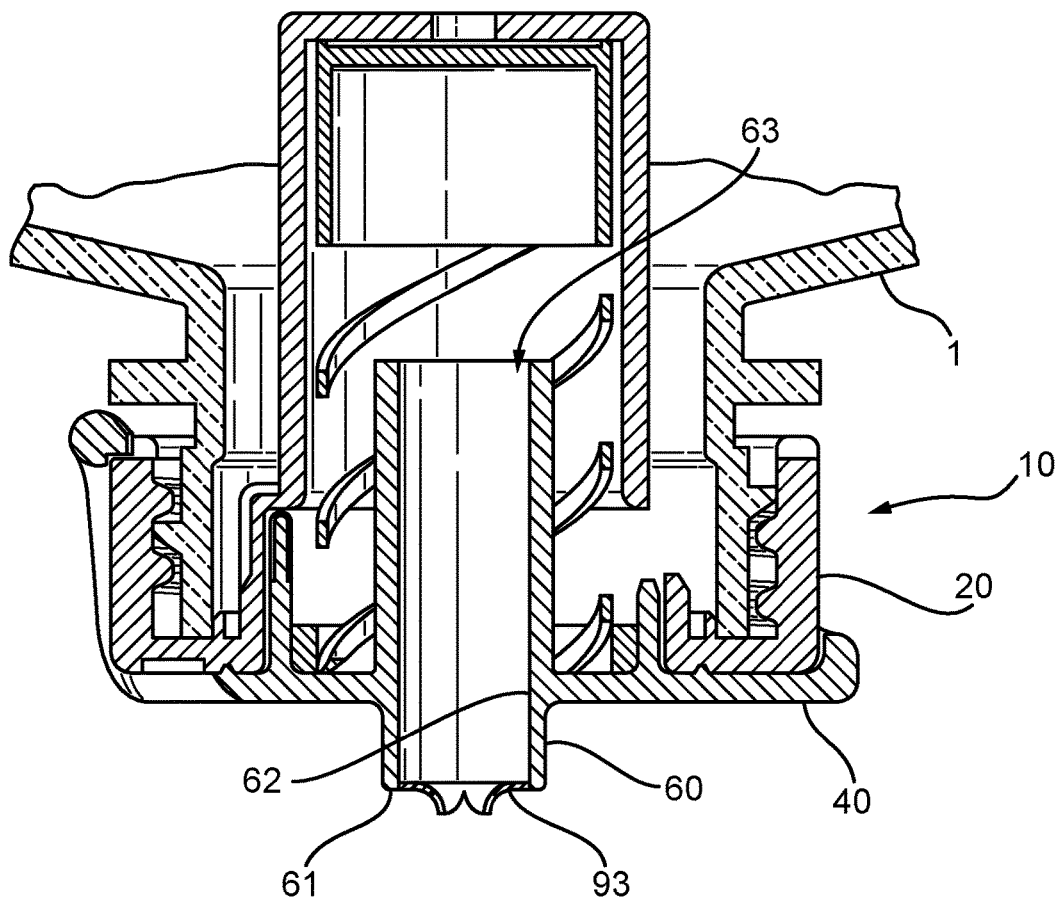

FIG. 9A illustrates a cross-sectional view of a third and alternative embodiment of a dosing dispensing closure.

Figure 9B:
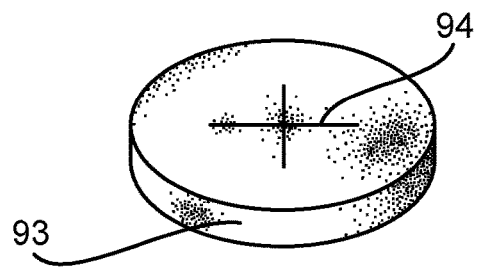

FIG. 9B illustrates a perspective view of an elastomeric valve forming a part of the dosing dispensing closure of FIG. 9A.

Figure 10:
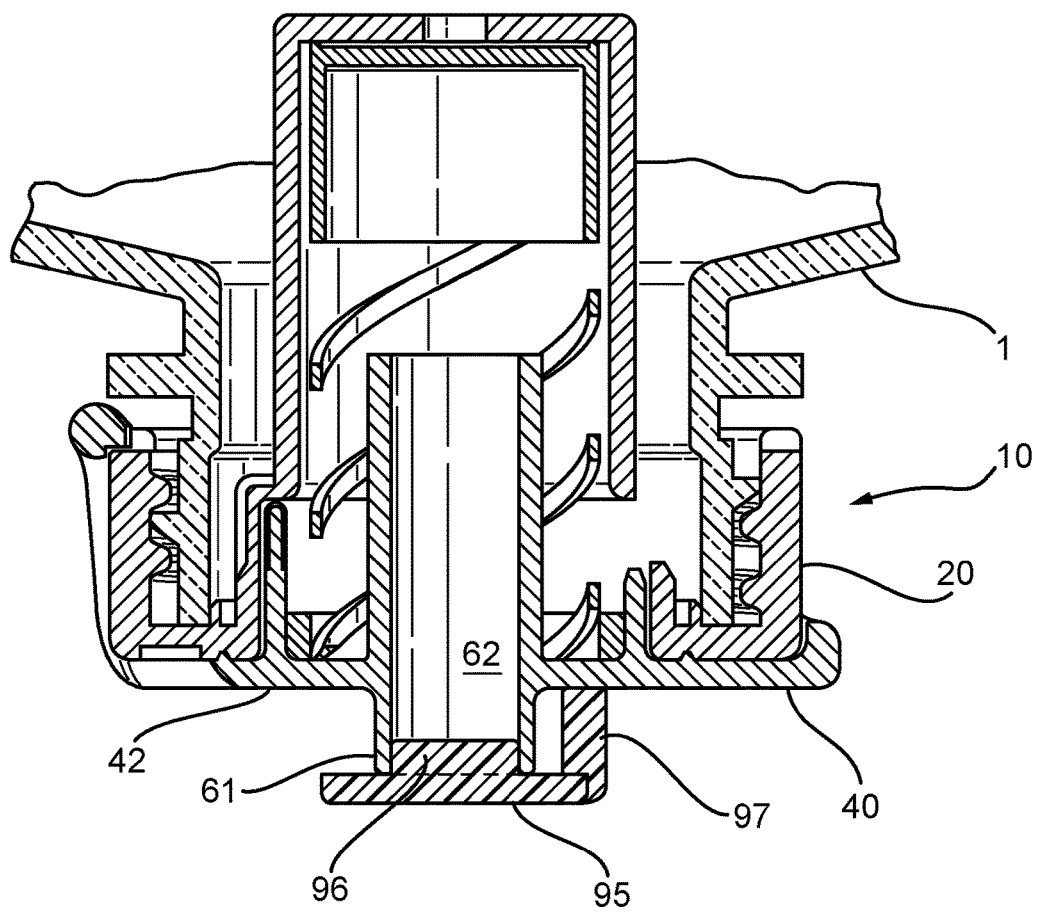

FIG. 10 depicts a cross-sectional view of a fourth and alternative embodiment of a dosing dispensing closure.

Figure 11A:
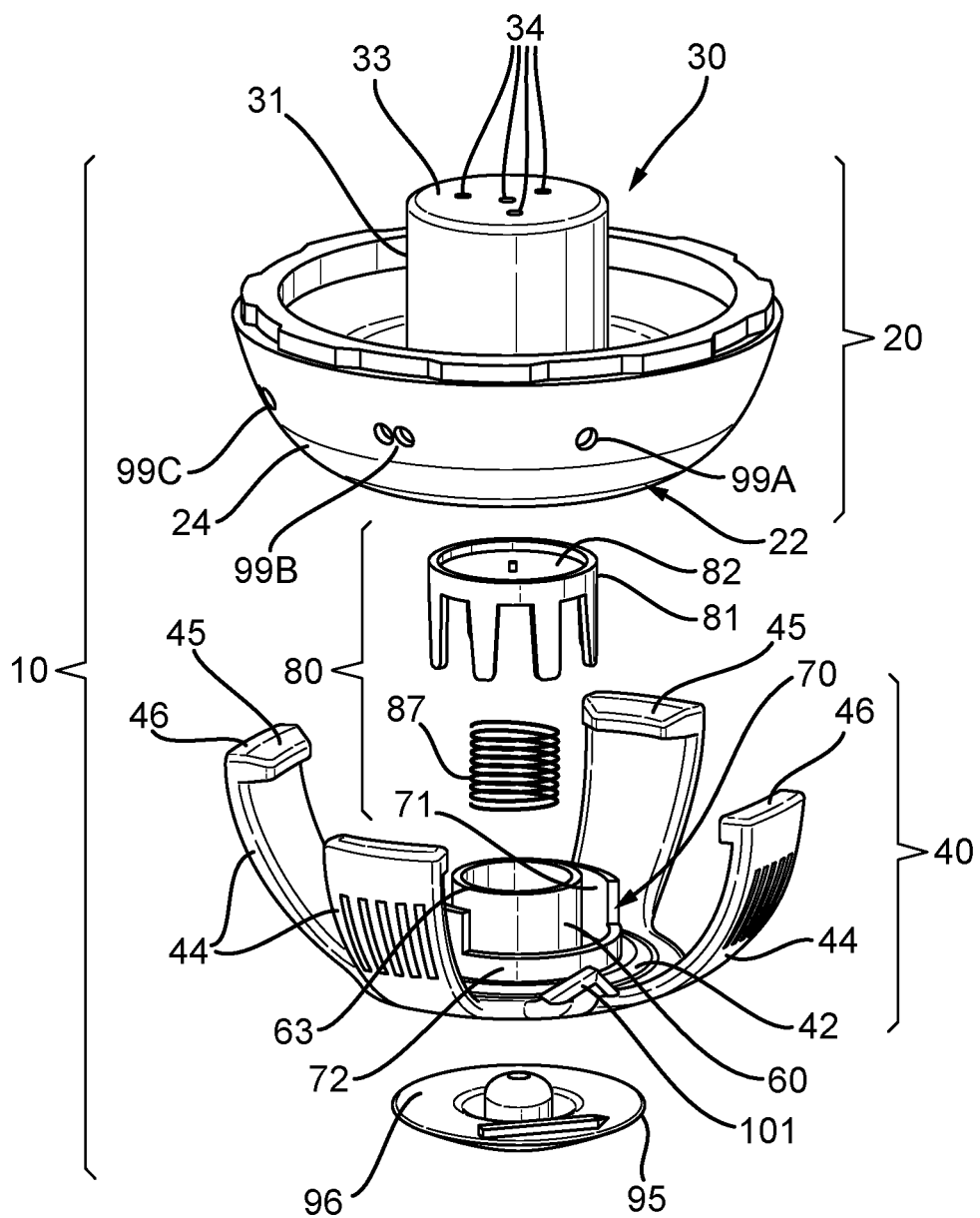
Figure 11B:
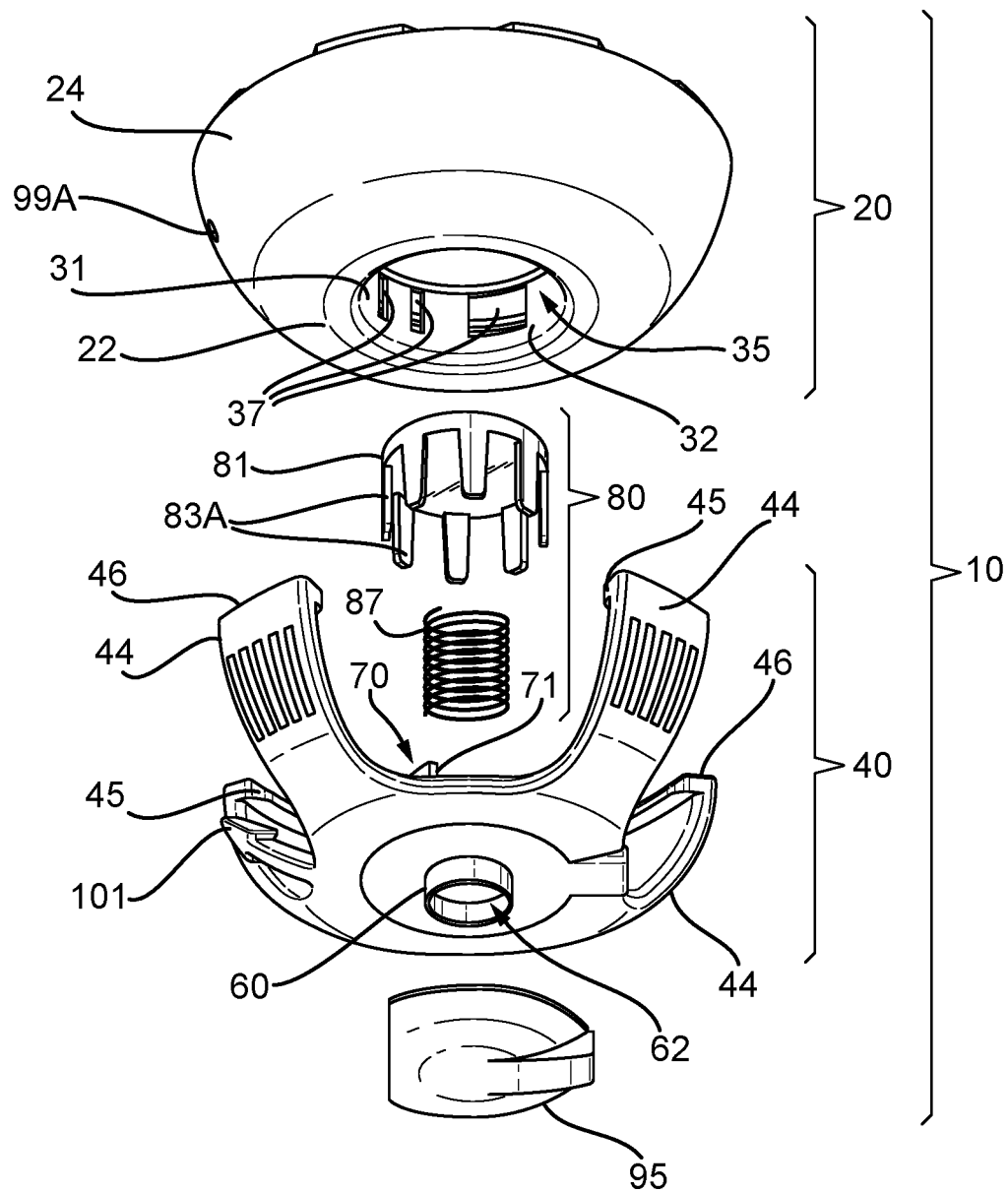

FIGS. 11A and 11B illustrate in two perspective views a further embodiment of a dosing dispensing closure.

FIGS. 12A1, 12A2, 12B1, 12B2, 12C1 and 12C2 depict cross-sectional views of a portion of the dosing dispensing closure of FIGS. 11A and 11B.

The dosing dispensing closures of the invention are particularly well adapted to be removably affixed to a container. Alternatively the closures can be permanently attached to a container. Preferably the container comprises a neck upon which, or to which, the dosing dispensing closure can be affixed. Advantageously, the neck of the container comprises one or more screw threads, which may be formed as a part of the neck, to which mating and corresponding screw threads forming part of the dosing dispensing closure may be engaged. Alternatively, where such mating and corresponding screw threads are not provided on one or more of the container and/or the dosing dispensing closure, other sealing or attachment methods and means may be employed. By way of nonlimiting examples such include one or more of: interference fit between a part of the dosing dispensing closure and a part of the container, preferably at the neck of such a container; a snap-type fit between a part of the dosing dispensing closure and a part of the container, preferably the neck of such a container; use of a glue, adhesive, or other chemical which may be used to chemically bond portions of the dosing dispensing closure, and a part of the container, especially preferably the neck of such a container; ultrasonic welding between a part of the dosing dispensing closure, and a part of the container, especially preferably the neck of such a container. Additionally, the use of a further element, such as a compression band, simultaneously encasing part of the container, and a part of the dosing dispensing closure to thereby provide a liquid tight seal therebetween, may also be used. Indeed, any known art method can be utilized, provided that such does not interfere with the operative characteristics of the dosing dispensing closure, and that a generally liquid tight seal is formed between the dosing dispensing closure and the container.

The container itself may be of any size, configuration, and is only required that it be capable of containing a quantity of a fluid composition within its interior, and optionally, but particularly preferably that the container be also compressible. Such a compressible container is also advantageously suitably sized so that it can be grasped by a user or consumer, who can thereafter apply pressure to one or more sidewalls or other parts of the container thereby increasing the internal pressure of the container. As typically a quantity of air is also present simultaneously with the quantity of the fluid composition, compression of the air increases the internal pressure of the container which establishes a pressure differential between the interior of the container, and the exterior environment. Such a pressure differential extends across the dosing dispensing closure and aids in its function as will be described in more detail hereinafter. While the container itself may have an additional orifice not engaged with the dosing dispensing closure, or a vent hole in communication with the ambient atmosphere, desirably such is not present, unless such can be sealed, such that the interior pressure of the container is caused to increase, e.g., by deforming, or compressing parts of the container. It is to be understood that the dosing dispensing closure can also be utilized with a rigid container, provided that a means of increasing the pressure within the interior of the container, and upon the fluid composition contained therein can be caused to occur. Such is also satisfactory in introducing a pressure differential between the interior of the container, and the exterior environment of the container, and in causing the dosing dispensing closure to operate.

The container may be made of any suitable material, but advantageously one or more polymeric materials are used as a primary material of construction. Non-limiting examples of such include synthetic thermoplastic or thermosetting polymers, including but not limited to: polyamides (e.g., Nylon), polyolefins (e.g., polypropylene, polyethylene, HMWPE, LDPE, HDPE) as well as polyalkyleneterephalates (i.e., polyethylene terephthalate, polybutylene terephthalate), polystyrenes, polysulfones, polycarbonates as well as copolymers formed from monomers of one or more of the foregoing. Advantageously such polymeric materials include those which may be formed into dispensing devices such as by stamping, injection molding, vacuum molding, or other thermoforming or thermosetting processes, with blow molding being a particularly preferred process as containers having flexible sidewalls or other flexible portions can be effectively produced, and provided at relatively low cost. Such containers may be rigid, self-supporting flasks or bottles and/or may be pouches, films, or other containers which are not self-supporting unless either at least partially filled with a fluid composition, and/or provided within a rigid supporting structure, such as a frame, etc. Furthermore, such synthetic thermoplastic or thermosetting polymers are also frequently chemically tolerant to a variety of chemical compositions, including the fluid compositions which may be used in conjunction with the container and the dosing dispensing closure described herein.

The container may also be formed of materials other than synthetic thermoplastic or thermosetting polymers including, but not limited to: glass, ceramics, other vitreous materials, as well as metals which may be generally rigid, such as stamped, extruded, or formed metal containers, or may be flexible metal containers such as pouches, foils, and the like which may, or may not be self-supporting in the absence of a quantity of the fluid composition being contained within. These latter materials also find use, although due to the widespread availability at a low cost of synthetic thermoplastic or thermosetting polymers, bottles, flasks, and/or pouches formed with or of such thermoplastic or thermosetting polymers are generally preferred advantageously used.

Similarly the materials of construction of the dosing dispensing closures include all of the foregoing materials described with reference to the materials useful in forming the container. Also preferably, the materials construction of the dosing dispensing closures are synthetic thermoplastic or thermosetting polymers as such can be relatively reliably molded, e.g, injection molded, into the separate elements of the dosing dispensing closures with good mechanical tolerances to ensure a good physical fitting and interaction between the separate elements, and at the same time provide good tolerance to chemical compositions particularly of the fluid composition being dispensed through the said closure. However, other materials other than such synthetic thermoplastic or thermosetting polymers can be used in one or more of the separate elements, e.g., metal springs may be used as parts of the dosing dispensing closure in certain configurations. Similarly, if so desired, or more elements of the dosing dispensing closure can be formed of metal, vitreous, glass, or other materials.

The dosing dispensing closures of the container include cooperating parts or elements which can be moved or adjusted with respect to each other by a consumer or other user so to provide a degree of control the dosing amount of the fluid composition being dispensed through the dosing dispensing closure. Such provides a degree of variability of the amount of the fluid composition dosed. Advantageously such adjustments may be easily undertaken by such consumer of the user from the exterior of the container upon which the dosing dispensing closure is mounted, and without requiring removal of the dosing dispensing closure from the container.

The dosing dispensing closures of the container are advantageously used to dispense a fluid composition. Non-limiting examples of such fluid compositions include inanimate surface treatment compositions including cleaning and/or sanitizing and/or disinfecting compositions which are used without dilution or which require subsequent dilution with a further quantity of a further fluid or liquid, e.g, water; personal care compositions such as skincare products, shampoos, hair conditioners, lotions, creams, bodywash compositions; dilutable fluid products useful in other applications than those previously identified, e.g., concentrated compositions which are intended to be diluted in a solvent, such as water, an organic solvent or an aqueous/organic solvent mixture in order to form a working strength solution therefrom.

While the dosing dispensing closures can be used with any fluid composition, e.g, liquids, preferably the fluid compositions are ones having a viscosity of at least 25 cP, and (in order of increasing preference) having a viscosity of at least 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 525, 550, 575, 600, 625, 650, 675, 700, 725, 750, 775, 800, 825, 850, 875, 900, 925, 950, 975, 1000, 1100, 1200, 1300, 1400, 1500, 1600, 1700, 1800, 1900, 2000, 2250, 2500, 2750, 3000, 3250, 3500, 3750, 4000, 4250, 4500, 4750, 5000, 5500, 6000, 6500, 7000, 7500, 8000, 8500, 9000, 9500, and 10000, all in cP, or a viscosity having a value within a range within the above indicated viscosities.

Figure 1A:
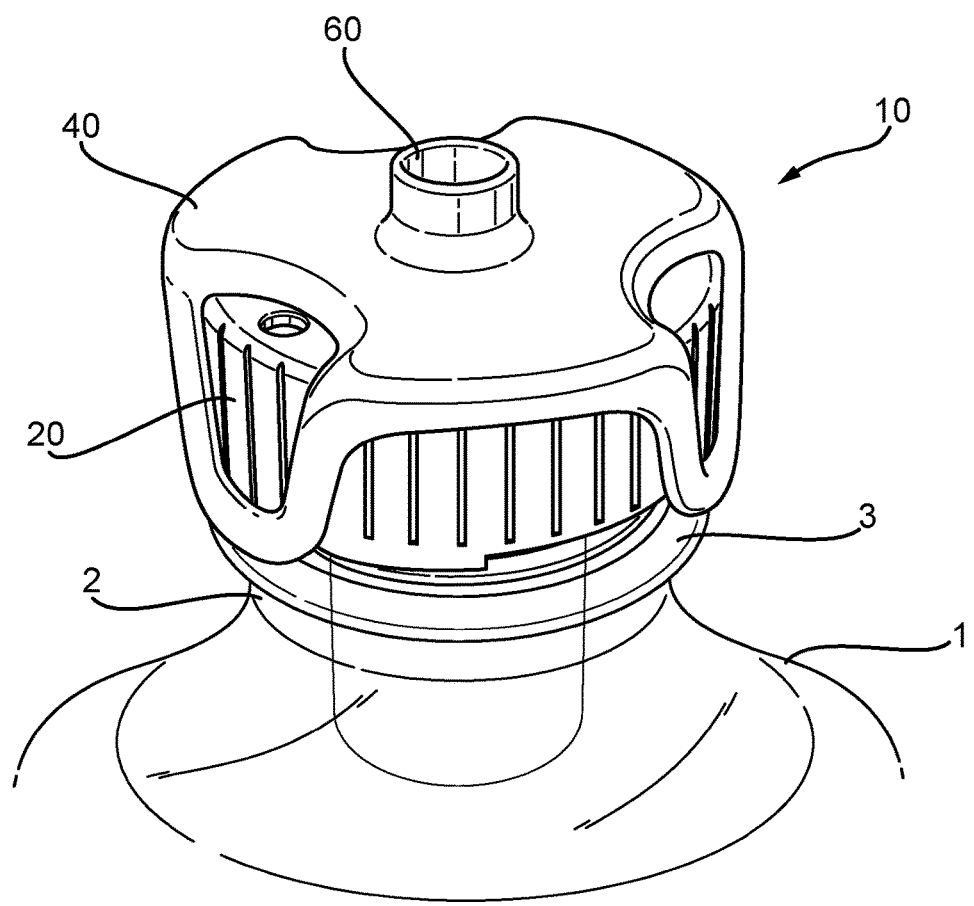

The construction, and operative characteristics of the dosing dispensing closures are disclosed and discussed with reference to the drawings, which illustrate several preferred embodiments, many of which share common features. Common elements or parts amongst these various embodiments are identified using the same letter or numeral. It is be understood also that certain parts or elements not present in a particular embodiment (or drawing figure), may nonetheless be adapted or used with a different embodiment (as depicted in a different drawing figure), and that all fall such depicted embodiments and variants thereof are considered to within the scope of the present invention. FIG. 1A provides a perspective view of an assembled dosing dispensing closure 10 sealingly mounted upon the neck 2 of a flexible container 1, of which only a portion of the container 1 is visible. The depicted container 1 (e.g., a bottle, or flask) is formed of a flexible polymer, and includes a neck collar 3 which provide means whereby the flexible container 1 can be conveniently grasped by a user or consumer, e.g., when lifting the container 1. The dosing dispensing closure 10 includes a body cap 20 and a control cap 40 through which extends a part of a fluid delivery tube 60. The body cap 20 and the control cap 40 are at least partially displaceable, preferably rotatable, with respect to each other.

Figure 1B:
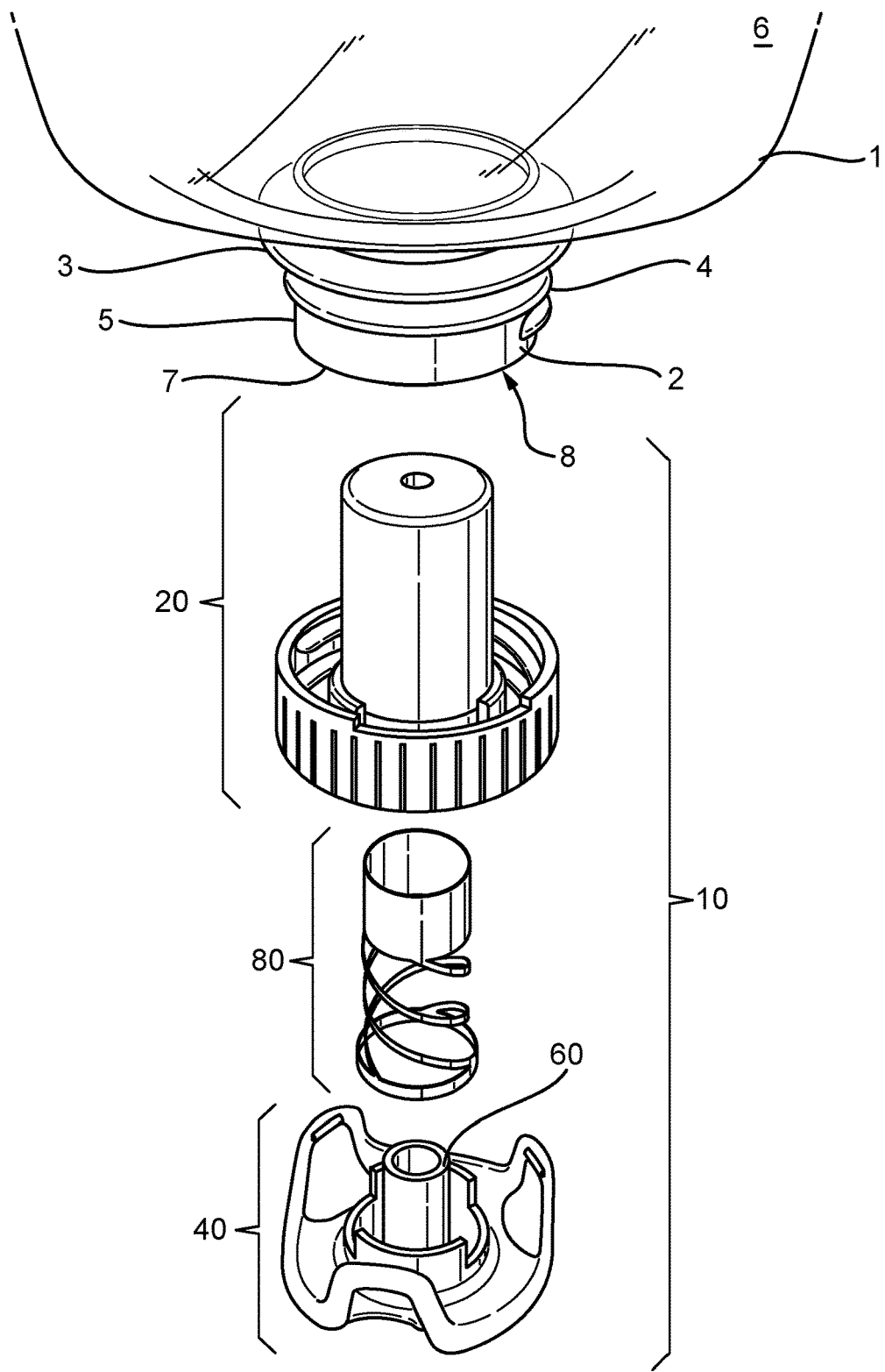

FIG. 1B prevents an exploded view of the elements of the dosing dispensing closure 10 according to FIG. 1A, as well as a portion of the container 1. As is now seen from this figure, the container 1 further comprises an interior volume 6 within which a fluid composition, as well as a quantity of air ("airspace") may be present during use of the dosing dispensing closure 10. The neck 2 further includes a cylindrical sidewall 5 from which extends one or more threads 4 as well the neck collar 3, which neck 2 has an end 7, and which neck 2 defines a neck passage 8 extending from the end of the neck 7 through the neck 2 and into the interior volume 6. The dimensions of the neck passage 8 are desirably sufficiently sized to allow for the insertion of one or more elements of the dosing dispensing closure 10 into the neck 2 as well as preferably also into a part of the interior volume 6 when the dosing dispensing closure 10 is mounted upon the next 2 of the container 1.

The dosing dispensing closure 10 comprises three cooperating parts or elements, a body cap 20, a piston assembly 80 and a control cap 40 which when properly configured and assembled are each moveable with respect to one or more of the other parts or elements. By establishing an appropriate engagement of these parts, a user of the dosing dispensing closure 10 may adjust the operating characteristics and hence the amount of a fluid composition dose delivered from the dosing dispensing closure 10 without requiring disassembly of these parts or elements. Rather, such variation in the delivered dose of a fluid composition may be achieved solely by realignment of the relative positions of parts of the body cap 20 with the control cap 40 by a user or consumer. Such is explained with more specificity with respect to FIGS. 2A, 2B and 2C each of which depict a different schematic, cross-sectional views of the dosing dispensing closure of FIGS. 1A and 1B, in one of three different configurations.

Figure 2A:
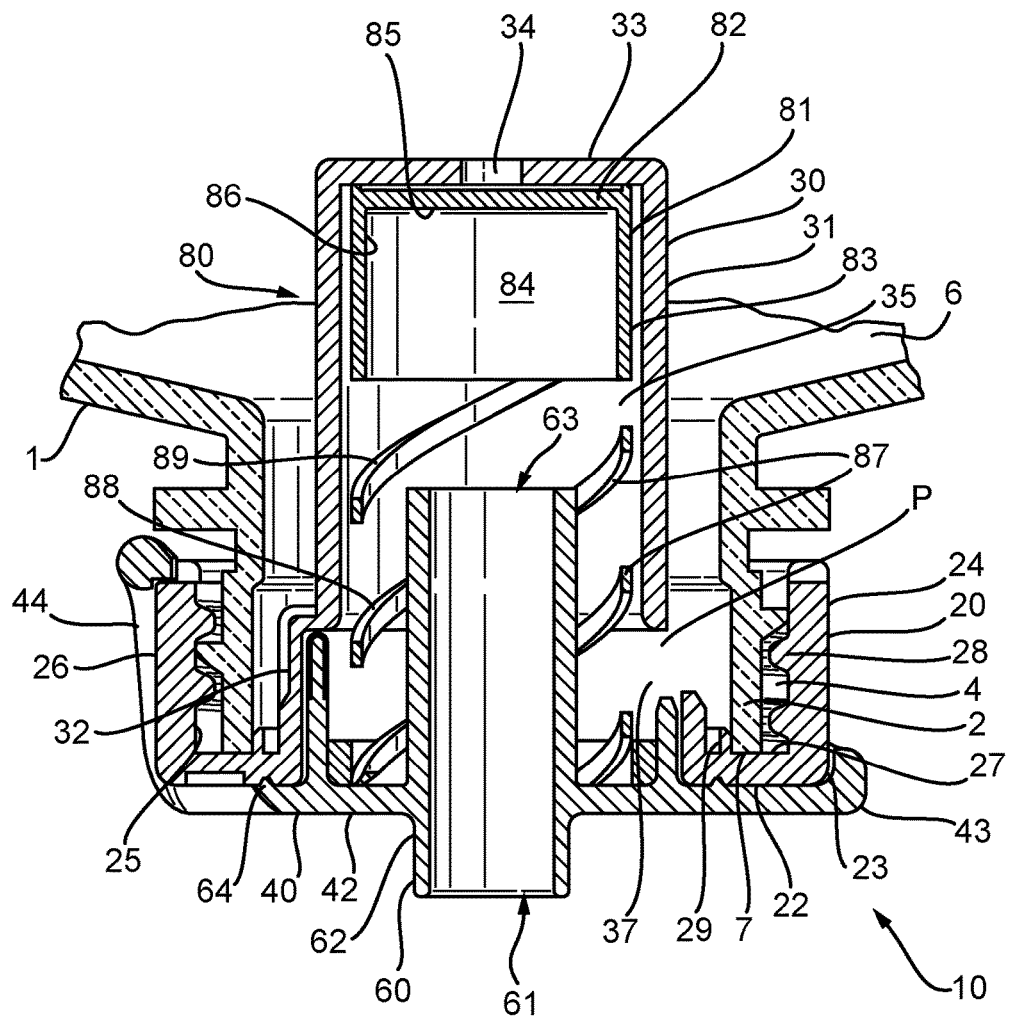

FIG. 2A illustrates a cross-sectional view a dosing dispensing closure 10 mounted upon the neck 2 of a container 1, via cooperating mating threads 4 of the neck 2 and corresponding threads 28 present in the body cap 20. The body cap 20 includes a cap top 22 which engages against the end 7 of the neck 2 to form a friction fit therebetween, which is preferably also a fluid-tight seal. From the outer peripheral margin 23 of the cap top 22 extends a depending outer skirt wall 24 which extends around the circumference of the cap top 22, and as depicted on the figure, extends in a direction perpendicular to the cap top 22. The outer skirt wall 24 includes an outer face 26 and an inner face 25, from which inner face 25 extend one or more mating threads 28 which are used to cooperatively engage with the corresponding threads 4 of the neck 2 so to form a friction fit therebetween. Such sets of matching mating threads 4, 28 provide for an effective means for removably mounting the dosing dispensing closure 10 onto the container 1. Preferably, in order to ensure a good liquid-type fit between the container 1 and the dosing dispensing 10, the cap top 22 further comprises an inner peripheral sealing flange 29 which extends downwardly from the underside 27 of the cap top 22 and which peripheral sealing flange 29 engages, and forms a friction fit between a the end 7 of the neck 2, Thus, when the mating threads 4, 28 are appropriately and sufficiently engaged, a friction type fit is formed therebetween, and a liquid-type seal is formed between the end of the neck 7 and the underside of the body cap 20.

Figure 2C:
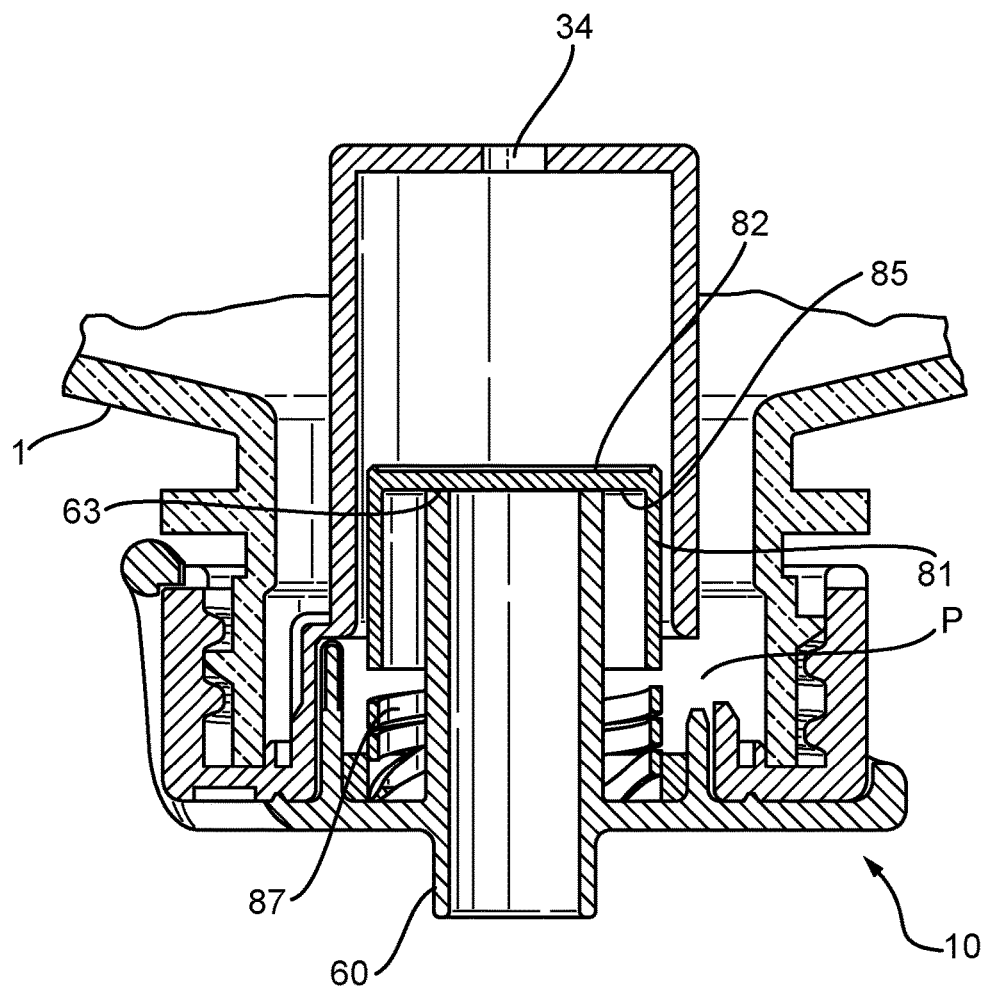

The body cap 20 further comprises a cylindrical section 30 which extends perpendicularly from and depends from the underside 27 of the cap top 22. The cylindrical section 30 extends via a sidewall 31 which is generally concentric with the outer skirt wall 24 and the peripheral sealing flange 29. The sidewall 31 includes a bridge section 32 which is proximate to the underside 27 of the cap top 22, and which extends to the sidewall section 31 and which in turn extends to an end wall 33 which extends transversely and perpendicularly to the sidewall 31 and thus terminates the cylindrical section. The end wall 33 comprises a transit orifice 34, which breaches the end wall 33 and provides a fluid path between the interior volume 6 of the container 1 and the bore 35 of the cylindrical section 30. One or more inlet orifices 37 are also present within and breach the sidewall 31 of the cylindrical section 30. See also FIGS. 6B, 6C and 6D each of which illustrates a perspective view of the body cap 20, and an inlet orifice 37 passing through a part of the bridge section 32. Although the inlet orifice 37 illustrated in the figure is generally of an arcuate, generally rectangular configuration when viewed from a perpendicular position, it is to be understood that any configuration of an inlet orifice may be used, as it is only required that such may be used to define a fluid passageway into the bore 35. Preferably, such one or more inlet orifices 37 are located in the proximity of the underside 27 of the cap top 22, and are approximately laterally coincident with one or more of the mating threads 28 of the body cap 20. Such a placement ensures that, when the container 1 containing a quantity of a fluid composition within its interior 6 is inverted (as shown in FIGS. 2A, 2B and 2C) that even without compressing the container 1 but under the force of gravity, said fluid composition flows in the direction of the neck 2 and may enter the bore 35 of the cylindrical section 30 and begin to fill that space. The rapidity of such filling of the bore 35 in part depends upon the viscosity of the fluid composition, upon the internal pressure within the interior 6 of the container 1, but is most strongly influenced upon the cross-sectional area, or size of the inlet orifice(s) 37 which define a flow path between the interior 6 and the bore 35. Simply stated, a smaller inlet orifice(s) 37 requires a greater amount of time for refilling of the space defined by the bore 35 as compared to a relatively larger inlet orifice(s) 37 having a larger size or cross-sectional area through which the fluid composition enters the bore 35.

Present within the bore 35 and located between the end wall 33 and the body cap 20, and in particular between the cap top 22 and the end wall 33, is a piston assembly 80. The piston assembly 80 comprises a piston head 81 having a piston top 82 and a cylindrical piston sidewall 83 depending therefrom, a piston cavity 84 defined by the underside 85 of the piston top 82 and the inner sidewall 86 of the cylindrical piston sidewall 83, and a compression means, here provided by a helical spring assembly 87 having two individual helical springs 88, 89 which extend between the piston head 81 and the cap top 22. Advantageously, the configuration of the mention of the piston assembly 80 in particular the piston head 81, as well as of the helical springs 88, 89 is concentric with the sidewall 31 of the cylindrical section 30. In an initial, uncompressed (alternately in a "least compressed") configuration as depicted on FIG. 2A, the helical springs 80, 89 extend as illustrated, and urge the piston head 81 towards and/or against the end wall 33. In such an initial configuration as depicted in that figure, the interior volume of the bore 35 is at its maximal amount and is adapted to contain a maximal amount of a fluid composition which may enter via one or more inlet orifices 37 which breach the sidewall 31.

The dosing dispensing closure 10 further includes a control cap 40, which is at least partially displaceable, (preferably is rotatable,) with respect to the body cap 20; parts of the control cap 40 extend through part of the body cap 20 when the dosing dispensing closure is fully assembled. The control cap 40 includes a control cap end 42 through which extends in a generally perpendicular orientation a fluid delivery tube 60 which is preferably concentric with the cylindrical section 30 of the body cap 20 when the elements of the dosing dispensing closure 10 are assembled, viz. the interior sidewall 70. The fluid delivery tube 60 includes an open outlet end 61, and an intermediate center tube section 62 which extends to a distal inlet end 63. The fluid composition (not shown) may transit through the tube section 62 between the inlet end 63, and the output and 61, whereby it is dispensed to a consumer or user. Radially outwardly from the fluid delivery tube 60, and at or near the outward peripheral margin 43 of the end face 42 of the control cap 40 extend one or more control arms 44 which are adapted to be moveably engageable with a part of the body cap 20. The control cap 40 preferably forms a liquid-type seal with the body cap 20; preferably a liquid tight seal exists between the control cap end 42 and the cap top 22. This may be facilitated, for example by providing a corresponding flange 64 which is concentric with and extends from control cap end 42 and abuts the cap top 22 as depicted.

Figure 3A:
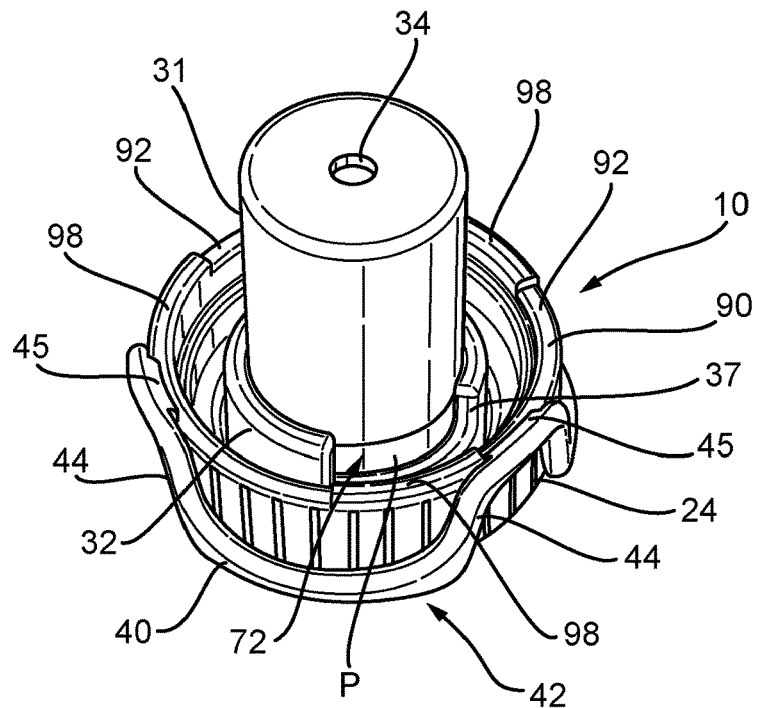
FIGS. 3A and 3B illustrate two perspective views of the dosing dispensing closure according to the prior figures.
Figure 3B:
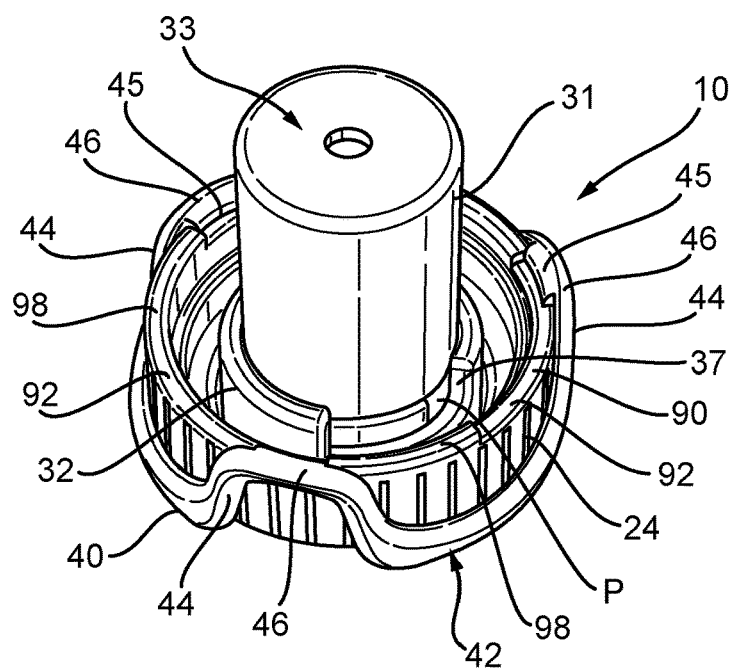

As best from FIGS. 3A and 3B, the control cap 40 includes a plurality of control arms 44 which extend in a direction generally perpendicular to the control cap end 42. A part of each of the control arms 44 included in engagement means 45 which, in cooperation with the part of the body cap 20, provides for a mechanical, preferably slidable mechanical, connection between the control cap 40 and the body cap 20. In the depicted embodiment, best seen from FIG. 4B, the engagement means 45 is provided as an inwardly extending tab which extends inwardly towards the fluid delivery tube 60 from or near the tip 46 of each of the control arms 44.

As is further seen from these underside and inverted views of the assembled elements forming the dosing dispensing closure 10, the base 90 of the outer skirt wall 24 includes one or more recessed portions 92 in which the overall height of the depending outer skirt wall 24 is relatively shorter than an adjacent portion 98 thereof, i.e., is "castellated". In the particular embodiment shown, to be understood as illustrative only, the base 90 of the outer skirt wall 24 includes recessed portions 92 intermediate portions wherein the full height 98 of the outer skirt wall 24 is present. The engagement means 45, here the tabs 45 present on control arms 44, extend and engage the recessed portions 92 of the base 90 of the outer skirt wall 24. Desirably, the tolerances of the body cap 20 and of the control cap 40, and in particular the control arms 44, the engagement means 45 and the recessed portions 92 are such that a good, but slidable mechanical fit is achieved to therebetween. In this manner, a user or consumer of the dosing dispensing closure 10 may slide, viz, rotate, the control 40 with respect to the body 20 as limited by the engagement means, and the recessed portions 92.

Figure 4A:
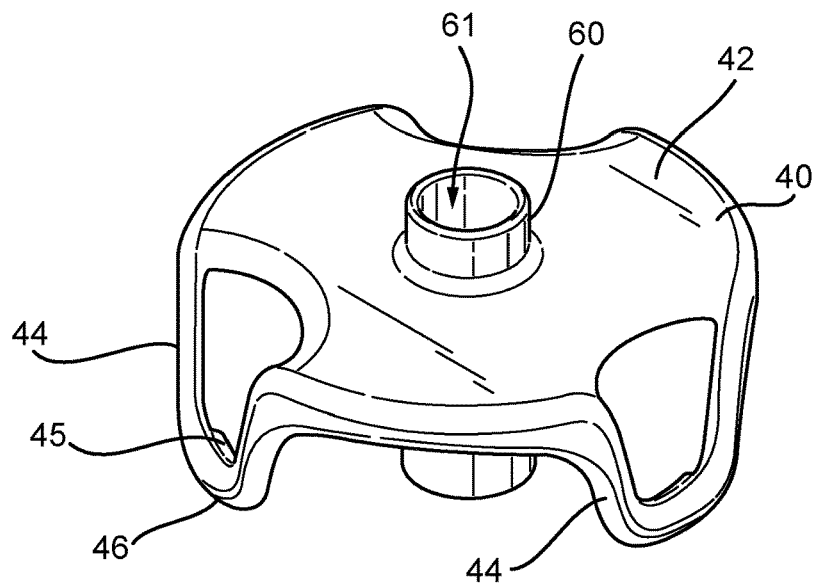
FIGS. 4A and 4B illustrate in two perspective views the control cap of the dosing dispensing closure according to the prior figures.
Figure 4B:
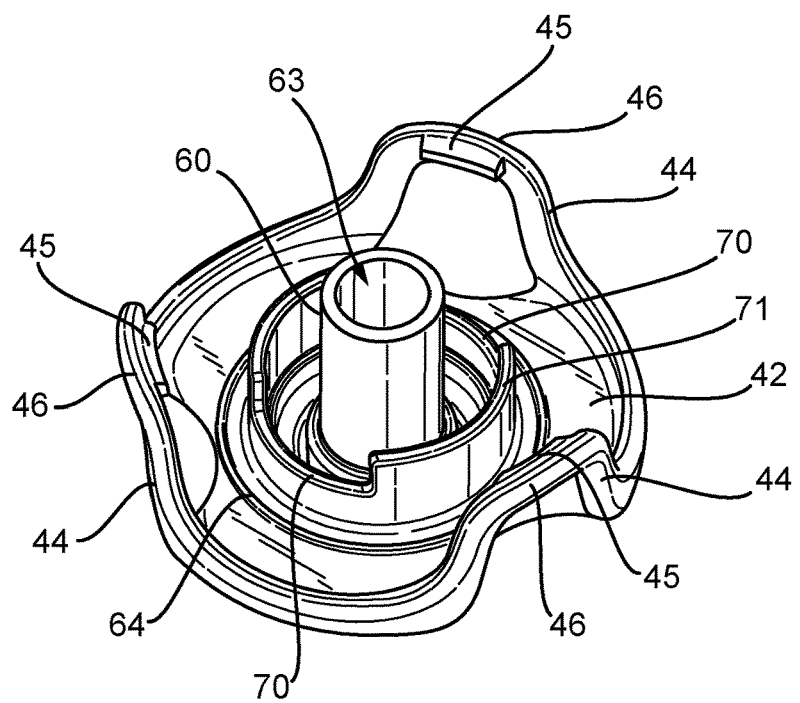

Regarding the depiction of FIGS. 4A and 4B, there is visible an interior sidewall 70 which depends from the control end cap 42, and is generally concentric with and outward of from the fluid delivery tube 60. As is visible therefrom, the interior sidewall 70 includes at least one full-height sidewall section 71 and at least one, relatively shorter reduced-height sidewall section 72. In this depicted embodiment, the interior sidewall 70 includes two relatively shorter reduced-height sidewall sections 72, between two full-height sidewall sections 71. Thus, this generally circular, interior sidewall 70 also is "castellated". Preferably the interior sidewall 70 abuts against the bridge section 32 of the sidewall 31.

FIG. 4A depicts a top perspective view of the control cap 40 as depicted on FIG. 4B.

Returning now to FIGS. 3A and 3B, as is more clearly visible therefrom, when control cap 40 and the body cap 20 are properly assembled and in a slidable mechanical engagement therebetween, the generally circular, interior sidewall 70 of the control cap 40 is in a slidable, abutting contact with the bridge section 32 of the sidewall 31. Thereby, when the control cap 40 and the body cap 20 are in a first configuration, such as in FIG. 3A at least one, relatively shorter reduced-height sidewall section 72 of the interior sidewall 70 of the control cap 40 and at least one of the one or more inlet orifices 37 present within the bridge section 32 and breaching the sidewall 31 of the cylindrical section 30 are in an alignment which also defines a flow orifice or flow path "P" through which a fluid composition may enter the bore 35 of the cylindrical section 30. A fully opened, or "uneclipsed" configuration is seen in FIG. 3A, whereas a partially opened or "eclipsed" configuration is seen in FIG. 3B in which figure the relative positions of the control cap 40 and the body cap 20 are in a second configuration such that a part of the inlet orifices 37 present within the sidewall 31 is blocked or obscured by a part of the full-height sidewall section 71 of the control end cap 42 of the control cap 40. In FIG. 3B, a flow orifice or flow path of a reduced cross-sectional area relative to that of the one depicted and provided in FIG. 3A results, which in turn reduces the volumetric flow rate of fluid composition into the bore 35 of the cylindrical section 30 under like temperature, pressure and viscosity conditions. It is also to be realized, that although not specifically shown in FIGS. 3A and 3B but fully understandable in light of these drawing figures that a "fully eclipsed" configuration may be established in which the full-height sidewall section 71 of the control end cap 42 of the control cap 40 is positioned to "fully eclipse" the inlet orifices 37 present within the sidewall 31 such that flow orifice or flow path through which a fluid composition may enter the bore 35 of the cylindrical section 30 is provided. Such is also later depicted on FIG. 6A.

It is also to be realized that whereas the depicted flow orifices or flow paths are of a generally rectangular configuration in FIGS. 3A and 3B, which is due to the configuration of the inlet orifices 37 and of the sidewall section 72 of the control cap 40, that flow orifices or flow paths of cross-sectional areas or geometries other than being generally rectangular in cross-section (as shown in FIGS. 3A and 3B) may also be provided. By way of non-limiting example, the interior sidewall 70 and/or the sidewall 31 may include one or more circular, elliptical or other alternatively shaped orifices passing through the interior sidewall 70 and/or the sidewall 31, which orifices define a flow orifice or flow path through which a fluid composition 6 may enter the bore 35 from container 1 when such orifices present in the control cap 40 and are not fully eclipsed by orifices present in the sidewall 31 of the cylindrical section 30.

Reference is made now to FIGS. 6A, 6B, 6C and 6D which illustrate in perspective views a further embodiment of a dosing dispensing closure, which in many respects is similar to the embodiment illustrated on FIGS. 3A, 3B, 4A and 4B. . As is visible on FIG. 6A, the control cap 40 and the body cap 20 are engaged and arrangement in a manner wherein the inlet orifices 37 are in a "fully eclipsed" position and no fluid composition may enter the bore 35 of the cylindrical section 30 except through the four transit orifices 34 illustrated. In FIG. 6B, there is depicted a second arrangement of the control cap 40 and the body cap 20 wherein the inlet orifices 37 are a partially opened or "eclipsed" configuration is seen in the figure wherein the relative positions of the control cap 40 and the body cap 20 are in a second configuration such that a part of the inlet orifices 37 present within the sidewall 31 is blocked or obscured by a part of the full-height sidewall section 71 of the control end cap 42 of the control cap 40, while in another part of the inlet orifices 37 a flow orifice or flow path of a reduced cross-sectional area relative to that of FIG. 6D is present, and a fluid composition may enter the bore 35 of the cylindrical section 30 as well as through the transit orifice 34. The embodiment of FIG. 6C is similar in most respects to that of FIG. 6B, except that the cross-sectional area of the inlet orifices 37 are larger than those depicted on FIG. 6B, and a fluid composition may enter the bore 35 of the cylindrical section 30 at greater volumetric flow rate than is provided by the configuration of FIG. 6B, and the fluid composition also enters the bore 35 of the cylindrical section 35 through the transit orifice 34. The final embodiment of FIG. 6D depicts the relative positions of the control cap 40 and the body cap 20 in a configuration which is a fully opened, or "uneclipsed" configuration. As visible from this figure, the full-height sidewall section 71 of the control end cap 42 of the control cap 40 is positioned behind the bridge sections 32, thereby defining the maximum cross sectional area of the arcuate rectangular configuration of the inlet orifices 37 which breach the sidewall 31 of the cylindrical section 30 and define a fluid passageway into the bore 35. In this depicted configuration a fully opened, or "uneclipsed" configuration is seen, which configuration also provides for the greatest volumetric flow rate for the fluid composition which enters the bore 35 of the cylindrical section 30, and as well as through the transit orifices 34.

The drawing FIGS. 6A, 6B, 6C and 6D depict in a sequence four specific configurations of a dosing dispensing closure 10 which on the one extreme, as per FIG. 6A is configured in a "fully eclipsed" configuration wherein pressurized fluid composition is only admitted to the bore 35 via the transit orifices 34, through two intermediate positions, viz. the configurations of FIGS. 6B and 6C, to the other extreme as per FIG. 6D where a fully opened, or "uneclipsed" configuration is provided. It is to be understood however that the relative positioning of the elements forming the dosing dispensing closure 10 may be varied anywhere between these two extremes to provide a relatively infinite range of possible configurations between that of FIGS. 6A and 6D, which in turn provides for a corresponding variability of the volumetric dosing of the pressurized fluid composition being dispensed using the dosing dispensing closure 10. A similar principle of operation is equally applicable to other embodiments of a dosing dispensing closure 10, including the embodiments discussed with reference to FIGS. 3A, 3B, 4A and 4B.

A comparison of the drawing figure of FIGS. 6A, 6B, 6C and 6D clearly illustrate that the relative positions of the body cap 20 and the control cap 40 also limit the size of the transit orifices, such that in at least a first relative position of the control cap with the body cap at least a portion of the at least one full-height sidewall eclipses at least a part of the at least one transit orifice of the body cap, and in at least a second relative position of the control cap with the body cap, at least a portion of the at least one full-height sidewall eclipses an area greater or less than the part of the at least one transit orifice of the body cap eclipsed (or obscured) in the said first relative position.

A comparison of the drawing figures of FIGS. 3A and 6A also illustrates that the size and/or the number of transit orifices 34 may be varied as well. Such may be done to control the operating characteristics of the dosing dispensing closure 10, and the fill rate of a part of the bore 35 as will be discussed in more detail below.

The operation of the dosing dispensing closure 10 is best understood from the consideration of the sequential drawing FIGS. 2A, 2B and 2C.

In an initial, uncompressed configuration as depicted on FIG. 2A, the container 6 is in an inverted configuration, and the helical springs 80, 89 are extended as illustrated, which urge the piston head 81 towards and/or against the end wall 33. The respective positions of the body 20 and the control 40 are such that the dosing dispensing cap 10 is in either an "uneclipsed" or "eclipsed" configuration, namely that at least a part of the inlet orifices 37 present within the sidewall 31 are not blocked or obscured by a part of the full-height sidewall section 71 of the control end cap 42 of the control cap 40, thereby defining a flow path P for liquid composition which may enter via one or more inlet orifices 37 which are intermediate bridge sections 32 and which breach the sidewall 31. A quantity of a fluid composition (not shown; preferably a viscous fluid composition having a viscosity of at least 25cP) contained within the interior 6 of the container 1 flows through the one or more inlet orifices 37 and enters the bore 35 of the cylindrical section 30.

Reference is now made to FIG. 2B, which depicts a configuration of the dosing dispensing closure 10 in an intermediate, dispensing configuration, and subsequent to the configuration depicted on FIG. 2A. Upon compression of the fluid composition 6 contained within the container 1, e.g, which may be imparted by a user or consumer manually squeezing the container 1, a quantity of the fluid composition 6 is urged, under compression through the one or more non-fully "eclipsed" inlet orifices 37 and simultaneously, another quantity of the fluid composition 6 enters via the transit orifice 34 and begins to fills a top part 35A of the bore 35 of the cylindrical part 30. The fluid composition 6 entering via the transit orifice 34 causes the movement of the piston head 81 against the forces of the helical spring assembly 87 and concurrently forcing the fluid composition within the bore 35 and between the underside 85 of the piston top 82 and the fluid delivery tube 60 into the intermediate center tube section 62 and ultimately out from the open outlet end 61.

Reference is now made to FIG. 2C, which depicts the dosing dispensing closure 10 in a final, fully dispensed configuration, and subsequent to the configuration depicted on FIG. 2B. As illustrated, under compression of the fluid composition 6, the piston head 81 has ceased its movement in the direction of the fluid delivery tube 60 and is in abutment therewith such that the helical spring assembly 87 is at its maximum compression within the dosing dispensing closure 10, and the underside 85 of the piston top 82 abuts against the inlet end 63 and provides a generally effective seal therebetween.

From the foregoing description and drawings it should be apparent that a dosing dispensing closure which may be reconfigured as disclosed with respect to FIGS. 6A-6D, and which operates in a manner as described with reference to FIGS. 2A-2C provides a user selectable feature in controlling the amount of a fluid composition dispensed from the said closure, which is achieved by configuring and/or reconfiguring the relative positions of the body cap 20 and the control cap 40. A user may move body cap 20 and the control cap 40 from a first respective position to a second position with respect to each other, e.g. by rotation, which causes the realignment of the relative positions of parts of the body cap 20 with the control cap 40 by the consumer. This in turn causes the relative positions of the interior sidewall 70 and its at least one full-height sidewall section 71 and at least one, relatively shorter reduced-height sidewall section 72, and the one or more inlet orifices 37 present within and breaching the sidewall 31 of the cylindrical section 30 to also change, which redefines the cross-sectional area of the flow orifice(s) or flow path "P" through which a fluid composition may enter the bore 35 of the cylindrical section 30, and which are thereafter dispensed, which in turn controls the dose amount (dose aliquot, dose mass, dose volume) dispensed. In such a manner, a realignment may be made between a first relative position of the control cap with the body cap wherein at least a portion of the at least one full-height sidewall eclipses at least a part of the at least one transit orifice of the body cap, and a second relative position of the control cap with the body cap, wherein at least a portion of the at least one full-height sidewall eclipses an area greater or lesser than the part of the at least one transit orifice of the body cap eclipsed in the said first relative position.

The quantity of the fluid composition, delivered outwardly from the dosing dispensing closure 10 as the position of the piston assembly 80 moves between the initial configuration shown in FIG. 2A, via the intermediate configuration shown in FIG. 2B to the final configuration shown in FIG. 2C defines the fluid dose delivered in such a single operation. The nature of the fluid composition, most importantly its viscosity, plays a role in determining the volumetric quantity of the dose delivered with a single dispensing operation as described above with reference to FIGS. 2A, 2B and 2C. The volumetric quantity of a dose can also be controlled by varying the relative positions of the body cap 20 and the control cap 40, which is described above in the discussion regarding FIGS. 3Am 3B, 4A, 4B, 6A, 6B, 6C and 6D, establishes the cross-sectional area or size of the inlet orifice(s) 37 present. Conveniently, this can be done without requiring disassembly of the dosing dispensing closure 10, and can be done by a consumer or user by simply twisting the control cap 40 with respect to the body cap 20. Also, no removal of the dosing dispensing closure 10 is required in order to reconfigure it to deliver a different dose. Additionally, wherein the body cap 20 and the control cap 40 are suitably configured with respect to one another, such that a fully eclipsed condition of the inlet orifice(s) 37 present are established, the egress of any of the fluid composition from the container 1 and the dosing dispensing closure 10 is denied.

Where the fluid composition 6 has a viscosity greater than that of water, preferably at least 25 cP, and even moreso when the fluid composition 6 has an increased viscosity, then the operation of the dosing dispensing closure 10 provides for more controllable dosing when the dosing dispensing closure 10 moves from the position of its elements shown in FIG. 2A, through the configuration shown in FIG. 2B to the final configuration of FIG. 2C, viz. a "dose dispensing cycle". During the compression of the fluid composition 6 within the container 1, the fluid composition 6 enters the cylindrical section 30 via the transit orifice 34. As is seen from the related sets of drawing figures, the dimensions of the transit orifice(s) 34 forming part of a dosing dispending closure 10 is constant. Thus at a specific pressure within the container 1, the size and/or dimensions of the transit orifice 34 acts as a flow meter which limits the volumetric flow rate into the top part 35A of the bore 35. This imparts a relatively constant pressure within the top part 35A of the bore 35 which urges the piston head 81 towards the fluid delivery tube 60; due to the pressure of the fluid composition, such establishes a top cylinder pressure "P1" within the top part 35A of the bore 35. Concurrently, the pressurized fluid composition 6 also simultaneously enters the bore 35 of the cylindrical section via the one or more or inlet orifices 37 present within and breach the sidewall 31 of the cylindrical section 30, each of which also have a cross-sectional area through which the fluid composition 6 flows as well to enter the bore 35. This establishes a bottom part 35B of the bore 35 which establishes a bottom cylinder pressure 35B. When the fluid composition is pressurized, e.g. by manually compressing the flexible container 1, pressure P2 is less than P1, which causes the motion of the piston head 81 in the direction of the fluid delivery tube 60. However, when compression of the liquid composition diminishes or ceased, then the force of the helical springs 88, 89 and pressure P2 acts to expel the fluid composition present in the top part 35A of the bore back to the flexible container 1.

With fluid compositions 6 of relatively higher viscosity, the amount of the fluid compositions 6 entering the bore 35 is lesser than for a fluid composition 6 of a lower relative viscosity, as at an established cross-sectional area the one or more or inlet orifices 37 the higher viscosity exhibits a lower volumetric flow rate into the bore 30 as the container 1 is pressurized during the dose dispensing cycle. The dose amount delivered in a dose dispensing cycle can thus be established with a reasonable degree of repeatability for a fluid composition 6. Wherein a larger dose is desired to be delivered, the open cross-sectional areas of the one or more or inlet orifices 37 can be increased, (or decreased) e.g, by displacing or otherwise adjusting the relative positions of the cap 20 and the control cap 40 which in turn varies the open cross-sectional areas of the one or more or inlet orifices 37. Thus it is understood that while the fluid composition 6 entering the cylindrical section 30 via the transit orifice 34 is not dispensed, its volumetric fill rate of the bore 30 is relatively constant and provides a rate of travel, viz., stroke of the piston head 81 which is relatively constant at a constant pressure, temperature and viscosity of the fluid composition 6; thus the actual control over the variations in the dose volume is moreso dependant upon the open cross-sectional areas of the one or more or inlet orifices 37 than on any other part of the dosing dispensing closure.

Subsequent to the dispensing of a dose of the fluid composition 6, upon the subsequent release of the compression within the container 1, the helical spring assembly 87 urges the piston head 81 in the direction of the transit orifice 34 and forces out any fluid composition present within the top part 35A outwardly therefrom until the piston head 81 resumes its original position as depicted in the configuration of FIG. 2A.

Wherein a multiplicity of doses are the fluid composition are intended or desire to be dispensed, sequential compression, and release of compression of the bottle fitted with the dosing dispensing closure 10 can be repeated as desired.

FIG. 5 provides a perspective view of a body cap 20 of the dosing dispensing closure of the prior figures FIG. 7A illustrates in a perspective view a yet further embodiment of a dosing dispensing closure 10, which is adapted to be mounted to a container 1 (not shown) via a set of mating threads 28 within the body cap 20. The body cap 20 is moveably coupled, e.g., rotatably displaceable, to a control cap 40. As is seen from exploded, perspective view presented in FIG. 7B of the dosing dispensing closure 10 of FIG. 7A, the body cap 20 further comprises a cylindrical section 30 having a sidewall 31 which extends to a defining a bore 35 (not shown), the cylindrical section 30 further comprising extends to a sidewall section 32 and which in turn extends to an end wall 33 which extends transversely and perpendicularly to the sidewall 31 and thus terminates the cylindrical section 30. As is seen from these drawing figures, a plurality of transit orifices 34 are present and extend through the end wall 33, allowing for passage of fluid composition into to and out of the bore 35. The sidewall 31 includes a plurality of bridge sections collectively referred to as 32 (but which are in later FIGS. 7C, 7D and 7E are individually identified) which span between the sidewall 31 and a part of the body cap 20 and which defines one or more inlet orifices collectively referred to as inlet orifices 37 (but which in later FIGS. 7C, 7D and 7E are individually identified) passing through part of the bridge section 32. As is seen from these figures, the inlet orifices 37 are present in an alternating arrangement with bridge sections 32. The inlet orifices 37 define fluid paths between the container 1 (not shown) and the bore 35 (not shown) of the cylindrical section 30. Preferably, such one or more inlet orifices 37 are located in the proximity of the underside 27 of the cap top 22, and are approximately laterally coincident with one or more of the mating threads 28 of the body cap 20. Such a placement ensures that, when the container 1 containing a quantity of a fluid composition within its interior 6 is inverted (as shown in FIGS. 2A, 2B and 2C) that even without compressing the container 1 but under the force of gravity, said fluid composition present in the container 1 flows in the direction of the neck 2 and may enter the bore 35 of the cylindrical section 30 and begin to fill that space. The control cap 40 also further comprises an integral fluid delivery tube 60 which is preferably concentric with the cylindrical section 30 of the body cap 20 when the elements of the dosing dispensing closure 10 are assembled. Further visible from the figure is an interior sidewall 70 which depends from the control end cap 42, and is generally concentric with and outward of from the fluid delivery tube 60. As is visible therefrom, the interior sidewall 70 includes one full-height sidewall section 71 and one, relatively shorter reduced-height sidewall section 72, which arrangement is also considered to be "castellated" as having one full -height sidewall section 71 adjacent to at least one, relatively shorter reduced-height sidewall section 72.

Reference is now made to FIGS. 7C, 7D and 7E which provides perspective partial cross-sectional views of the dosing dispensing closure 10 of FIGS. 7A and 7B in alternate configurations. Each of FIGS. 7C, 7D and 7E depict the dosing dispensing closure 10 of FIGS. 7A and 7B, at a planar section which is horizontal to the plane of the end wall 33 and taken at line segment "a-a" depicted on FIG. 7B. As seen, the interior sidewall 70 includes a full-height sidewall section 71 adjacent to at least one, relatively shorter reduced-height sidewall section 72, each being approximately 180 degrees of arc (viz., a half-circular shape). Also present are four separate bridge sections 32A1, 32A2, 32A3 and 32A4 (or collectively referred to as 32) of different widths or dimensions from at least one other of the four separate bridge sections 32A1, 32A2, 32A3 and 32A4. Also present are four the inlet orifice(s) 37A1, 37A2, 37A3 and 37A4 each between two adjacent bridge sections 32A1, 32A2, 32A3 and 32A4 which define a flow path into the cylindrical section 30 (not shown) and ultimately to the fluid delivery tube 60. The depictions of FIGS. 7C, 7D and 7E illustrate the different arrangements provided in three of a virtually infinite number of possible configurations of the interior sidewall 70 and the separate bridge sections 32A1, 32A2, 32A3 and 32A4 which in turn establishes the cross-sectional area the one or more or inlet orifices 37 through which the fluid composition may pass from the container 1 and into the cylindrical section 30.

With reference to FIG. 7C, as is visible thereon the body cap 20 and the control cap 40 are in a relative positional arrangement such that the full-height sidewall section 71 of the interior sidewall 70 obscures or "eclipses" inlet orifices 37A2, 37A3 and 37A4 thereby denying passage of the fluid composition therethrough, but at the same time inlet orifice 37A1 which is coincident with the reduced-height sidewall section 72 is "unelipsed" and inlet orifice 37A1 with its adjacent bridge sections 32A1 and 32A2 defines flow paths into the cylindrical section 30 (not shown) and ultimately to the fluid delivery tube 60, from whence the fluid composition may exit the dosing dispensing closure 10.

With reference now to FIG. 7D, a different relative positional arrangement of the body cap 20 and the control cap 40 is shown, viz. wherein the control cap 40 has been rotated approximately 90 degrees from the positional arrangement of FIG. 7C. As seen therefrom, the full-height sidewall section 71 of the interior sidewall 70 obscures or "eclipses" inlet orifices 37A3 and 37A4 thereby denying passage of the fluid composition therethrough, but at the same time inlet orifices 37A1 and 37A2 which are coincident with the reduced-height sidewall section 72 are "unelipsed" and the inlet orifices 37A1 and 37A2 with their adjacent bridge sections 32A1, 32A2 and 32A3 define flow paths into the cylindrical section 30 (not shown) and ultimately to the fluid delivery tube 60, from whence the fluid composition may exit the dosing dispensing closure 10.

A further different relative positional arrangement of the body cap 20 and the control cap 40 is shown in FIG. 7E. This depiction may be considered to be a further different relative positional arrangement of the body cap 20 and the control cap 40 is shown, viz. wherein the control cap 40 has been rotated approximately 90 degrees from the positional arrangement of FIG. 7D, and about 180 degrees from the positional arrangement of FIG. 7C. In this depiction, the full-height sidewall section 71 of the interior sidewall 70 obscures or "eclipses" none of the inlet orifices 37A1, 37A2, 37A3 and 37A4 and thus permits passage of the fluid composition therethrough, as each of inlet orifices 37A1, 37A2, 37A3 and 37A4are coincident with the reduced-height sidewall section 72 and are "unelipsed" such that the inlet orifices 37A1, 37A2, 37A3 and 37A4 and their adjacent bridge sections 32A1, 32A2, 32A3 and 32A4 define flow paths into the cylindrical section 30 (not shown) and ultimately to the fluid delivery tube 60, from whence the fluid composition may exit the dosing dispensing closure 10.

In the foregoing drawing FIGS. 7A, 7B, 7C, 7D and 7E are depicted separate bridge sections 32A1, 32A2, 32A3 and 32A4 (collectively referred to as 32) of different widths or dimensions from at least one other of the four separate bridge sections 32A1, 32A2, 32A3 and 32A4, and the four inlet orifice(s) 37A1, 37A2, 37A3 and 37A4 each between two adjacent bridge sections 32A1, 32A2, 32A3 and 32A4, which are also of different widths or dimensions from one another, however it is to be expressly understood that such is not a requirement and that two or more of the four separate bridge sections 32A1, 32A2, 32A3 and 32A4 can be of the same dimension, and/or two or more of the four the inlet orifice(s) 37A1, 37A2, 37A3 and 37A4 can be of the same dimension. Likewise, although the embodiment of the drawing FIGS. 7A, 7B, 7C, 7D and 7E disclose four separate bridge sections 32A1, 32A2, 32A3 and 32A4, and four the inlet orifice(s) 37A1, 37A2, 37A3 and 37A4, numbers other than 4, e.g, 2, 3, 5, 6, 7, etc. are also contemplated to be similarly useful.

With regard to the embodiment of the dosing dispensing closure 10 depicted on FIGS. 7A, 7B, 7C, 7D and 7E, while not shown in those figures, the depicted dosing dispensing closure 10 is further includes a piston assembly 80 as disclosed with reference to FIGS. 1A, 1B, 2A, 2B and 2C within the cylindrical section 30, and that the dosing dispensing closure 10 of these depicted embodiments operates similarly to the dosing dispensing closure 10 discussed with reference to FIGS. 2A, 2B and 2C.

The embodiment of the dosing dispensing closure 10 illustrated on FIGS. 7A, 7B, 7C, 7D and 7E provide a preferred embodiment of a dosing dispensing closure 10 in which a number of discrete pre-established units (aliquots, volumes) of a dispensed dose from a container comprising the dosing dispensing closure 10 may be provided. Based on the viscosity of the fluid composition, and the characteristics of the container or bottle, the relative size or cross-sectional areas of each of the 37A1, 37A2, 37A3 and 37A4 can be determined in order to provide several discrete unit doses which may be delivered upon an activation of the dosing dispensing closure 10. For example, in the configuration of FIG. 7C a discrete pre-established unit dose may be provided, while a next and a larger discrete pre-established unit dose may be provided by the configuration of FIG. 7D as in the latter, with each activation of the dosing dispensing closure 10, fluid composition enters the cylindrical part 30 through two uneclipsed inlet orifices (37A1, 37A2), versus the one uneclipsed inlet orifice (37A1) of FIG. 7C. An even larger unit dose may be provided by the configuration of FIG. 7E wherein all four available inlet orifices (37A1, 37A2, 37A3 and 37A4) are uneclipsed, allowing for the concurrent entry of fluid composition entering the cylindrical part 30.

FIGS. 8A and 8B depict in cross-sectional views, an alternative embodiments of a dosing dispensing closure 10 according to the present invention. As is seen from these figures, the depicted dosing dispensing closure is 10 are substantially similar to those described previously, particularly to those described in FIGS. 2A, 2B and 2C and operate in a similar manner. The primary difference between the embodiments of these latter FIGS. 8A and 8B resides in the provision of a fluid delivery tube 60 having a threaded exterior sidewall section 67, and a threaded bore 68 passing through the control end cap 42 of the control cap 40, which sets of mating threads define a liquid-tight seal therebetween. The fluid delivery tube 60 may now be rotated with respect to the control end cap 42 and its relative position thereto, and thus varied in its effective length within the bore 35. This in turn permits for the distance between the inlet end 63 and the piston head 81, more specifically the underside 85 of the piston top 82 to be varied. This in turn varies the volume of the bore 35, and the volume of the dose dispensed in a dispensing operation (as discussed with reference to FIGS. 2A, 2B and 2C) to be further controlled, and further varied by a user or consumer. The configuration as depicted in FIG. 8A depicts an arrangement of elements wherein a relatively smaller dose of the fluid composition is dispensed, as compared to the configuration of the dosing dispensing closure 10 is directed on FIG. 8B.

FIG. 9A illustrates a still further alternative embodiment of a dosing dispensing closure 10 of the invention, which incorporates a closure valve means, e.g. an elastomeric valve 93 which is separately depicted in FIG. 9B. The embodiment depicted on FIG. 9A is substantially identical to the embodiment of FIG. 2B, except for the addition of an elastomeric valve 93 which is placed across the intermediate center tube section 62 of the fluid delivery tube 60, here at or proximate to the open outlet end 61. As visible from FIG. 9A, as the fluid composition exits the fluid delivery tube 60, the pressure within the intermediate center tube section 62 urges and extends the elastomeric valve 93 into an open configuration, as shown in this cross-sectional view. However, upon the release of pressure, e.g, corresponding to the condition of the dosing dispensing closure 10 of FIG. 2A, the elastomeric valve 93 assumes a closed position, as depicted in more detail in FIG. 9B. In that figure, the valve opening 94 is defined by a series of slits which extends through the elastomeric valve 93 which remain in the closed position, as depicted, until pressure upon the elastomeric valve 93 to stands it, forcing the valve opening 94 to an open position, as in FIG. 9A. Such elastomeric valves 93 are per se, known to the art and without limitation, include rubber and silicone valves, but may also be made of other elastomeric materials as well which provide a similar function to depicted elastomeric valve 93.

FIG. 10 depicts a yet further alternative embodiment of a dosing dispensing closure 10 according to the present invention, which is substantially the same as the embodiment depicted on FIG. 2A. The depicted embodiment of FIG. 10 additionally provides a cap closure means, e g. a flip-cap type closure such as the depicted flip cap 95 having a plug part 96 which is fitted within the intermediate center tube section 62 of the fluid delivery tube 60 and forms a substantially fluid tight seal across the open outlet end 61 thereof. A support post 97 extends from the control end cap 42 and is hingedly attached to a part of the flip cap 95. Other cap closure means which provide a substantially liquid tight seal with the fluid delivery tube 60.

It is expressly contemplated that any closure of the invention may include one or more of a flip cap closure means, e.g. a flip cap 95 and/or a closure valve means, e.g., an elastomeric valve 93, as disclosed with reference to FIGS. 9A, 9B and 10. Similarly any closure of the invention may include a fluid delivery tube 60 having a threaded exterior sidewall section 67, and a threaded bore 68 as depicted and discussed with reference to FIGS. 8A and 8B.

A preferred embodiment of a dosing dispensing closure is depicted in FIGS. 11A and 11B illustrate in two perspective views a further embodiment of a dosing dispensing closure 10, wherein the parts are illustrated in exploded views. As seen from these figures, the dosing dispensing closure 10 is similar in many respects to the embodiment depicted on FIGS. 1A and 1B, and also comprises a body cap 20, a control cap 40 which is rotatable and/or displaceable with respect to the body cap 20, the control cap 40 further including a fluid delivery tube 60 extending therethrough. The body cap 20, which engages against the end of the neck of a container (not shown in FIGS. 11A, 11B, but shown in FIGS. 2A-2C) and preferably forms a liquid tight seal therewith, comprises a cap top 22 and in this embodiment the body cap 20 further includes a sloping depending outer skirt wall 24 which extends around the circumference of the cap top 22, which extends downwardly and outwardly from the cap top 22. The outer skirt wall 24 includes three separate indicator legends 99A, 99B and 99C which are radially spaced apart from one another and are embossed within the outer skirt wall 24. These indicator legends 99A, 99B. 99C may be more or less than three in number, and may be any visually discernible marking or symbol (alphanumeric or non-alphanumeric) which would be visually discernible to a user. By way of non-limiting examples, such indicator legends 99A, 99B. 99C may be embossed, printed on, raised from, or may also be part of a label adhered to or affixed to the outer skirt wall 24. In one embodiment the indicator legends 99A, 99B. 99C may be hollows or cavities which engage a part of the indicator means 101, such that a part of the indicator means 101 is removably engaged within an the indicator legend 99A, 99B. 99C and provide a releasable locking feature. In another embodiment one or more of the indicator legends 99A, 99B. 99C may be one or more upstanding elements which extend above the surface of the outer skirt wall 24 such that a part of the indicator means 101 is removably engaged upon or between two such upstanding elements, and provide a similar releasable locking feature without forming recesses in the outer skirt wall 24. The body cap 20 further includes a cylindrical section 30 which extends perpendicularly from and depends from the underside 27 of the cap top 22, the cylindrical section having a sidewall 31 and which terminates at an end wall 33. The end wall 33 includes several transit orifices 34 passing therethrough.

The control cap 40 includes a plurality of control arms 44 which extend outwardly from the fluid delivery tube 60, which control arms 44 are adapted to be moveably engageable with respect to a part of the body cap 20. The control cap 40 preferably forms a liquid-type seal with the body cap 30. A part of each of the control arms 44 included in engagement means 45 which, in cooperation with the part of the body cap 20, provides for a mechanical, preferably slidable mechanical, connection between the control cap 40 and the body cap 20. In the embodiment depicted, the engagement means 45 is provided as an inwardly extending tab which extends inwardly towards the fluid delivery tube 60 from or near the tip 46 of each of the control arms 44.

The control cap 40 further comprises an interior sidewall 70 which depends from the control end cap 42, and is generally concentric with and outward of from the fluid delivery tube 60. As is visible therefrom, the interior sidewall 70 includes at least one full-height sidewall section 71 and at least one, relatively shorter reduced-height sidewall section 72. In this depicted embodiment, the interior sidewall 70 includes at least two relatively shorter reduced-height sidewall sections 72, and at least two full-height sidewall sections 71. Thus, this generally circular, interior sidewall 70 of the control cap 40 is "castellated". Preferably the interior sidewall 70 abuts against the bridge section 32 of the sidewall 31, which is more clearly seen in FIG. 11B. As is seen in this figure, a part of the sidewall 31 adjacent or proximate to the cap top 22 of the body cap 20 is a bridge section 32 which abuts the interior sidewall 70 when the dosing dispensing closure 10 is assembled, and in certain rotational orientations of the control cap 40 with respect to the body cap 20, the provision of one or more fluid passages from the exterior of the cylindrical section 30 and from the interior volume of the container (not shown in FIGS. 11A, 11B; shown in FIGS. 2A, 2B and 2C) and into the bore 35 of the cylindrical section. This feature is discussed in more detail with reference to FIGS. 12A1, 12A2, 12B1, 12B2, 12C1 and 12C2.

In the embodiment illustrated on FIGS. 11A and 11B, the piston assembly 80 comprises a piston head 81 having a piston top 82 from which depend one or more piston legs 83A. The piston head 81 is fitted within the cylindrical section 30 and the configuration of the piston head 81 is concentric with the sidewall 31, which allows for the piston head 81 to move in a reciprocating manner within the cylindrical section 30. At one of its travel, the length of the piston legs 83A limit the displacement or travel of the piston head 82 within the cylindrical section 30, while at the other end of its travel the piston head 81 is limited by its abutment with the underside of the end wall 33. The piston assembly further includes a separate helical spring 87, here a metal spring which is positioned within the piston legs 83A as well as within the intermediate center tube section 62 of the fluid delivery tube 62. In an initial, uncompressed (alternately in a "least compressed") configuration the helical spring 87 urges the piston head 81 towards and/or against the end wall 33; in such a configuration the interior volume of the bore 35 is at its maximal amount and is adapted to contain a maximal amount of a fluid composition which may enter via one or more inlet orifices 37 which breach the sidewall 31. In a compressed configuration, the force of the helical spring 87 is exceeded and the helical spring 87 is compressed, until the piston top 82 abuts against the inlet end 63 and provides a generally effective seal therebetween, e.g, as shown in the configuration of FIG. 2C.

It is first to be understood that each of FIGS. 12A1, 12A2, 12B1, 12B2, 12C1 and 12C2 depict a part of the assembled dosing dispensing closure 10 of FIGS. 11A and 11B in alternative configurations, at a cross-sectional plane which is perpendicular to the concentric center line of the fluid delivery tube 60, and at a height approximately at the midpoint between the end face 42 of the control cap 40 and the maximum height of the interior sidewall 70. Thus, parts of the interior sidewall 70, its full-height sidewall sections 71 and relatively shorter reduced-height sidewall sections 72 are only depicted as they extend upward from the end face 42, and in the case of the full-height sidewall sections 71 to a point less than their maximum heights. Similarly as the cross-sectional plane is also perpendicular to the concentric center line of the cylindrical section 30 passes through a part of the bridge section 32, parts of the inlet orifices 37 (which in these figures are collectively referred to as "inlet orifices 37" but which are individually identified as inlet orifices 37-1, 37-2, 37-3 and 37-4 for ease of differentiation) are visible. It is next to be understood that FIG. 12A1 is a perspective, cross-sectional view of the dosing dispensing closure 10 shown in a plan view in FIG. 12A2, FIG. 12B1 is a perspective, cross-sectional view of the dosing dispensing closure 10 shown in a plan view in FIG. 12B2, and that FIG. 12C1 is a perspective, cross-sectional view of the dosing dispensing closure 10 shown in a plan view in FIG. 12C2.

With reference now to FIGS. 12A1 and 12A2, therein is depicted the configuration of the control cap 40 relative to the body cap 20 wherein the full-height sidewall section 71 wholly obscure as being coincident with the inlet orifices 37-2, 37-3 and 37-4, which arrangement blocks the passage of fluid through these orifices. However, a single flow orifice or flow path "P" is present and is defined by the orifice 37-1 which is coincident with a relatively shorter reduced-height sidewall section 72 of the interior sidewall 70 which is partially or wholly unobscured by the interior sidewall 70. Such a relative position of the control cap 40 relative to the body cap 20 defines the minimum dosage amount, as most of the available inlet orifices 37 are blocked by parts of the interior sidewall 70. Furthermore the cross sectional area of the inlet orifice 37-1 is the least of the inlet orifices, and less than/smaller than each of inlet orifices 37-2, 37-3 and 37-4. It is to be noted that such a relative configuration may be visually indicated by the relative positioning of the indicator means 101 which may be proximate to a specific indicator legend (e.g, 99A, 99B, 99C).

A further configuration is depicted on FIGS. 12B1 and 12B2. As is seen in this configuration, the two full-height sidewall sections 71 are positioned such that they wholly obscure and coincide with inlet orifices 37-3 and 37-4, which arrangement blocks the passage of fluid through these orifices. However, a two flow orifices or flow paths "P" is present and are defined by the orifices 37-1 and 37-2, which orifices are now coincident with a relatively shorter reduced-height sidewall section 72 of the interior sidewall 70 which orifices 37-1 and 37-2 are now partially or wholly unobscured by the interior sidewall 70. Such a relative position of the control cap 40 relative to the body cap 20 defines the relatively greater dosage amount, as several of the available inlet orifices 37 are blocked by parts of the interior sidewall 70, but several are now unobscured. It is also to be noted that such a relative configuration may be visually indicated by the relative positioning of the indicator means 101 which may be proximate to a further specific indicator legend (e.g, 99A, 99B, 99C), which is different than that of FIGS. 12A1 and 12A2.

A still further is depicted on FIGS. 12C1 and 12C2. As is seen in this configuration, the two full-height sidewall sections 71 are positioned such that they obscure and coincide with none of the inlet orifices 37-1, 37-2, 37-3 and 37-4, which arrangement allows for the passage of fluid through these orifices, and define now multiple (four) flow orifices or flow paths "P" is present and are defined by the orifices 37-1, 37-2, 37-3 and 37-4, each of which orifices are now coincident with one of the relatively shorter reduced-height sidewall section 72 of the interior sidewall 70. Such a relative position of the control cap 40 relative to the body cap 20 defines the greatest dosage amount, as none of the available inlet orifices 37 are blocked by parts of the interior sidewall 70, and each is unobscured. It is also to be noted that such a relative configuration may be visually indicated by the relative positioning of the indicator means 101 which may be proximate to a yet further specific indicator legend (e.g, 99A, 99B, 99C), which is different than that of FIGS. 12A1, 12A2, 12B1 and 12 B2.

In the foregoing description regarding FIGS. 12A1, 12A2, 12B1 and 12 B2 the relative positioning of the indicator means 101 with respect to a specific indicator legend (e.g, 99A, 99B, 99C) are such that one or more of the individual orifices 37-1, 37-2, 37-3 and 37-4 are not only partially obscured ("partially eclipsed") but rather that each one of the individual orifices 37-1, 37-2, 37-3 and 37-4 is either wholly unobscured ("uneclipsed") or wholly obscured ("fully eclipsed") which allows for the design of the dosing dispensing closure 10 to have a generally repeatable and measured aliquot of composition dispensed with a dispensing operation. However, it is understood that such is a preference, but not a limitation of the present invention and that the relative rotational positioning of the interior sidewall 70 with respect to the one of the one or more inlet orifices 37 present within and breaching the sidewall 31 of the cylindrical section 30 may be essentially infinitely varied.

It is further expressly contemplated that the dosing dispensing closure may be permanently affixed to a suitable container such that the container, once its fluid composition has been delivered from the container through the dosing dispensing closure, cannot be easily refilled by a consumer. In such an embodiment the dosing dispensing closure and the container may include a different interface than the sets of mating threads (4, 28) illustrated and discussed with respect to the drawing figures. In such an embodiment, the dosing dispensing closure may be otherwise fitted to the container or a part thereof, e.g. the neck, such as by ultrasonic welding, gluing, a very tight friction fit, providing a sealing means or sealing element intermediate the dosing dispensing closure which resists or denies removal of the dosing dispensing cap from the container. Alternatively the dosing dispensing closure may be affixed to the container with a frangible closure means such that after the dosing dispensing closure is installed upon the closure, and thereafter removed, the frangible closure is broken and denies the subsequent reattachment of the dosing dispensing closure to the container and the formation of a liquid tight seal therebetween, thus ensuring that the dosing dispensing closure cannot be reused once removed from a container.

Use of the dosing dispensing closure of the invention provides also for a method for controllably dispensing doses of a fluid composition from within a container, which method comprises the steps of: utilizing a container which contains a quantity of a fluid composition within its interior and which further includes a dispensing closure according to any of the embodiments described herein, and, dispensing dosed amounts of a fluid composition via the dosing dispensing closure from the container. In preferred embodiments of this method, varying dose amounts may be dispensed from the container having the dosing dispensing closure as described herein by means of user intervention.

Particularly with reference to the embodiments of FIGS. 11A, 11B, between or prior to a dispensing operation, the user or consumer of a container with the dosing dispensing closure 10 affixed on a container 1 may rotate the control cap 40 to a desired position, preferably such that the indicator means 101 corresponds with one of the specific indicator legends 99A, 99B or 99C, which may represent specific volumetric dosage amounts, an thereafter the container 1 is inverted and compressed, e.g, manually squeezed, by a consumer and an aliquot of the composition is dispensed via the dosing dispensing closure 10. Such volumetric dosage amounts may be relatively precise, e.g, 5 ml, or may be a an approximate volumetric amount, e.g, 5-10 ml, or may be merely a relative amount which is generally greater than or less than the amount which is dispensed by placement of the indicator means 101 in the region of or upon an adjacent indicator legend.

The invention claimed is:

1. A dosing dispensing closure having a user selectable feature adapted to control an amount of a fluid composition dispensed through the dosing dispensing closure, the dosing dispensing closure comprising:
a body cap having a cap top and a cylindrical section extending from the cap top, the cylindrical section having a bore, a sidewall, and an end wall, the cylindrical section also having one or more bridge sections between the sidewall and the cap top, and one or more inlet orifices intermediate the one or more bridge sections which define fluid passages adapted to permit the flow of the fluid composition therethrough, the end wall having at least one transit orifice adapted to permit the flow of the fluid composition therethrough;
a piston assembly having a piston head and a compression element biasing the piston head towards the end wall of the body cap, wherein the piston assembly is positioned within the bore of the cylindrical section and the piston head is moveable within the bore;
and a control cap which is displaceable with respect to the body cap, which includes a control cap end through which extends a fluid delivery tube, an interior sidewall having at least one full-height sidewall section and at least one reduced-height sidewall section, such that:
in at least a first relative position of the control cap with the body cap, at least a portion of the at least one full-height sidewall eclipses at least a part of the at least one inlet orifice of the body cap; and,
in at least a second relative position of the control cap with the body cap, at least a portion of the at least one full-height sidewall eclipses an area greater or lesser than the part of the at least one inlet orifice of the body cap eclipsed in the said first relative position.

2. The dosing dispensing closure according to claim 1, wherein the body cap further includes a depending outer skirt wall which extends from an outer peripheral margin of the cap top.

3. The dosing dispensing closure according to claim 2, wherein the depending outer skirt wall includes mating threads.

4. The dosing dispensing closure according to claim 1, wherein the control cap further includes a plurality of control arms having an engagement means which cooperate with a part of the body cap and which are adapted to provide a slideable mechanical connection between the control cap and the body cap.

5. The dosing dispending closure according to claim 1, wherein the control cap and the body cap form a liquid tight seal therebetween.

6. The dosing dispensing closure according to claim 1, wherein the control cap further comprises an indicator means, and wherein the body cap includes one or more indicator legends, wherein an alignment of the indicator means with one of the indicator legends corresponds to a first volumetric dosage amount deliverable via the dosing dispensing closure, and wherein an alignment of the indicator means with a further one of the indicator legends, when present, corresponds to a different volumetric dosage amount deliverable via the dosing dispensing closure.

7. A flexible container which contains a quantity of a fluid composition having a viscosity of at least 25 cP, having mounted thereon a dosing dispensing closure according to claim 1.

8. A method of controllably dispensing doses of a fluid composition from within a container, the method comprising the steps of:
utilizing a container which contains a quantity of a fluid composition and which further includes a dosing dispensing closure according to claim 1, and,
dispensing dosed amounts of the fluid composition via the dispensing closure from within the container.

9. A method of controllably dispensing differing volumetric doses of a fluid composition from within a container, the method comprising the steps of:
utilizing a container which contains a quantity of a fluid composition and which further includes a dosing dispensing closure according to claim 1;
dispensing one or more doses of the fluid composition from the container via the dosing dispensing closure;
subsequently, realigning relative positions of the body cap and the control cap, and thereafter dispensing one or more doses of the fluid composition from the container via the dosing dispensing closure.

10. A dosing dispensing closure having a user selectable feature adapted to control an amount of a fluid composition dispensed through the dosing dispensing closure, the dosing dispensing closure comprising:
a body cap having a cap top adapted to be directly attachable to a container containing the fluid composition, and a cylindrical section extending from the cap top, the cylindrical section having a bore, a sidewall, and an end wall, the cylindrical section also having one or more bridge sections between the sidewall and the cap top, and one or more inlet orifices intermediate the one or more bridge sections which define fluid passage adapted to permit the flow of the fluid composition therethrough, the end wall having at least one transit orifice adapted to permit the flow of the fluid composition therethrough;
a piston assembly having a piston head and a compression means, wherein the piston assembly is positioned within the bore of the cylindrical section and the piston head is moveable within the bore;
and a control cap which is displaceable with respect to the body cap, which includes a control cap end through which extends a fluid delivery tube, an interior sidewall having at least one full-height sidewall section and at least one reduced-height sidewall section, such that:
in at least a first relative position of the control cap with the body cap, at least a portion of the at least one full-height sidewall eclipses at least a part of the at least one inlet orifice of the body cap; and,
in at least a second relative position of the control cap with the body cap, at least a portion of the at least one full-height sidewall eclipses an area greater or lesser than the part of the at least one inlet orifice of the body cap eclipsed in the said first relative position.

11. The dosing dispensing closure according to claim 10, wherein the body cap further includes a depending outer skirt wall which extends from an outer peripheral margin of the cap top.

12. The dosing dispensing closure according to claim 11, wherein the depending outer skirt wall includes mating threads.

13. The dosing dispensing closure according to claim 10, wherein the control cap further includes a plurality of control arms having an engagement means which cooperate with a part of the body cap and which are adapted to provide a slideable mechanical connection between the control cap and the body cap.

14. The dosing dispending closure according to claim 10, wherein the control cap and the body cap form a liquid tight seal therebetween.

15. The dosing dispensing closure according to claim 10, wherein the control cap further comprises an indicator means, and wherein the body cap includes one or more indicator legends, wherein an alignment of the indicator means with one of the indicator legends corresponds to a first volumetric dosage amount which will be dispensed via the dosing dispensing closure, and wherein an alignment of the indicator means with a further one of the indicator legends, when present, corresponds to a different volumetric dosage amount deliverable via the dosing dispensing closure.

16. A flexible container which contains a quantity of a fluid composition having a viscosity of at least 25 cP, having mounted thereon a dosing dispensing closure according to claim 10.

17. A method of controllably dispensing doses of a fluid composition from within a container, the method comprising the steps of:
utilizing a container which contains a quantity of a fluid composition and which further includes a dosing dispensing closure according to claim 10; and,
dispensing dosed amounts of the fluid composition via the dispensing closure from within the container.

18. A method of controllably dispensing differing volumetric doses of a fluid composition from within a container, which method comprising the steps of:
utilizing a container which contains a quantity of a fluid composition and which further includes a dosing dispensing closure according to claim 2;
dispensing one or more doses of the fluid composition from the container via the dosing dispensing closure;
subsequently realigning relative positions of the body cap and the control cap, and thereafter dispensing one or more doses of the fluid composition from the container via the dosing dispensing closure.

19. The dosing dispensing closure of claim 10, wherein the compression means is a spring.

* * * * *

UNITED STATES PATENT AND TRADEMARK OFFICE
CERTIFICATE OF CORRECTION

PATENT NO. : 10,071,836 B2
APPLICATION NO. : 15/302620
DATED : September 11, 2018
INVENTOR(S) : Holroyd et al.

It is certified that error appears in the above-identified patent and that said Letters Patent is hereby corrected as shown below:

On the Title Page

Under the heading Foreign Application Priority Data item [30]:
"April 16, 2014 (GB) ......... 1406899.4"
Should read:
-- "April 16, 2014 (GB) ......... 1406889.4" --

Signed and Sealed this
Eighteenth Day of December, 2018

Andrei Iancu
*Director of the United States Patent and Trademark Office*